(12) United States Patent
Brewer et al.

(10) Patent No.: US 12,191,501 B2
(45) Date of Patent: Jan. 7, 2025

(54) ANODES FOR LITHIUM-BASED ENERGY STORAGE DEVICES

(71) Applicant: Graphenix Development, Inc., Williamsville, NY (US)

(72) Inventors: John C. Brewer, Rochester, NY (US); Paul D. Garman, Pittsford, NY (US); Kevin Tanzil, Rochester, NY (US)

(73) Assignee: Graphenix Development, Inc., Williamsville, NY (US)

( * ) Notice: Subject to any disclaimer, the term of this patent is extended or adjusted under 35 U.S.C. 154(b) by 0 days.

(21) Appl. No.: 18/170,080

(22) Filed: Feb. 16, 2023

(65) Prior Publication Data

US 2023/0216061 A1    Jul. 6, 2023

Related U.S. Application Data

(63) Continuation of application No. 16/998,773, filed on Aug. 20, 2020, now abandoned.

(Continued)

(51) Int. Cl.
*H01M 4/66*    (2006.01)
*H01M 4/04*    (2006.01)
(Continued)

(52) U.S. Cl.
CPC ......... *H01M 4/667* (2013.01); *H01M 4/0428* (2013.01); *H01M 4/366* (2013.01);
(Continued)

(58) Field of Classification Search
CPC .... H01M 4/0428; H01M 4/134; H01M 4/366; H01M 4/48; H01M 4/5815; H01M 4/667;
(Continued)

(56) References Cited

U.S. PATENT DOCUMENTS

2011/0111304 A1* 5/2011 Cui ............... H01M 4/70
429/231.95
2016/0197351 A1* 7/2016 Tani ............. H01M 4/628
429/162
(Continued)

FOREIGN PATENT DOCUMENTS

WO    WO-2016126610 A1 *    8/2016    ........ H01M 10/0562

OTHER PUBLICATIONS

Michael W. Forney, "High performance silicon free-standing anodes fabricated by low-pressure and plasma-enhanced chemical vapor deposition onto carbon nanotube electrodes", Journal of Power Sources, vol. 228, 2013 (Year: 2013).*
(Continued)

*Primary Examiner* — Matthew T Martin
*Assistant Examiner* — Ankith R Sripathi
(74) *Attorney, Agent, or Firm* — David D. Hsu; Polsinelli LLP

(57) ABSTRACT

Methods of making an anode for a lithium-based energy storage device such as a lithium-ion battery are disclosed. Methods may include providing a current collector. The current collector may include an electrically conductive layer and a surface layer overlaying over the electrically conductive layer. The surface layer may have an average thickness of at least 0.002 μm. The surface layer may include a metal chalcogenide including at least one of sulfur or selenium. Methods may include depositing a continuous porous lithium storage layer onto the surface layer by a PECVD process. The continuous porous lithium storage layer may have an average thickness in a range of 4 μm to 30 μm and comprises at least 85 atomic % amorphous silicon.

18 Claims, 11 Drawing Sheets

Related U.S. Application Data

(60) Provisional application No. 62/889,950, filed on Aug. 21, 2019.

(51) Int. Cl.
  | | |
  |---|---|
  | *H01M 4/36* | (2006.01) |
  | *H01M 4/48* | (2010.01) |
  | *H01M 4/58* | (2010.01) |
  | *H01M 10/0525* | (2010.01) |
  | *H01M 10/0565* | (2010.01) |
  | *H01M 10/0568* | (2010.01) |
  | *H01M 10/0569* | (2010.01) |

(52) U.S. Cl.
  CPC ........... *H01M 4/48* (2013.01); *H01M 4/5815* (2013.01); *H01M 10/0525* (2013.01); *H01M 10/0565* (2013.01); *H01M 10/0568* (2013.01); *H01M 10/0569* (2013.01); *H01M 2300/0028* (2013.01); *H01M 2300/0082* (2013.01); *H01M 2300/0085* (2013.01)

(58) Field of Classification Search
  CPC ......... H01M 10/0525; H01M 10/0568; H01M 10/0569; H01M 2300/0028
  See application file for complete search history.

(56) References Cited

U.S. PATENT DOCUMENTS

| | | | |
|---|---|---|---|
| 2016/0285081 A1* | 9/2016 | Matsuno | H01M 4/386 |
| 2019/0140267 A1* | 5/2019 | Gopalakrishnan Nair | H01M 4/0404 |
| 2021/0020899 A1* | 1/2021 | Halalay | H01M 4/0471 |

OTHER PUBLICATIONS

U.S. Appl. No. 16/998,773, Advisory Action, Mailed On Feb. 2, 2023, 6 pages.
U.S. Appl. No. 16/998,773, Final Office Action, Mailed On Oct. 13, 2022, 13 pages.
U.S. Appl. No. 16/998,773, Non-Final Office Action, Mailed On Jul. 6, 2022, 12 pages.
Lin et al., "Reviving the Lithium Metal Anode for High-Energy Batteries", Nature Nanotechnology, vol. 12, Mar. 7, 2017, pp. 194-206.
Sakabe et al., "Porous Amorphous Silicon Film Anodes for High-Capacity and Stable All-Solid-State Lithium Batteries", Communications Chemistry, vol. 1, No. 24, May 3, 2018, pp. 1-9.

* cited by examiner

ANODES FOR LITHIUM-BASED ENERGY STORAGE DEVICES

CROSS REFERENCE TO RELATED APPLICATIONS

This application is a continuation of U.S. patent application Ser. No. 16/998,773, entitled "ANODES FOR LITHIUM-BASED ENERGY STORAGE DEVICES," filed Aug. 20, 2020, which claims the benefit of priority of U.S. Provisional Application No. 62/889,950, entitled "ANODES FOR LITHIUM-BASED ENERGY STORAGE DEVICES," filed Aug. 21, 2019, which are incorporated herein by reference in their entirety for all purposes.

TECHNICAL FIELD

The present disclosure relates to lithium ion batteries and related energy storage devices.

BACKGROUND

Silicon has been proposed as a potential material for lithium-ion batteries to replace the conventional carbon-based anodes which have a storage capacity that is limited to ~370 mAh/g. Silicon readily alloys with lithium and has a much higher theoretical storage capacity (~3600 to 4200 mAh/g at room temperature) than carbon-based anodes. However, insertion and extraction of lithium into the silicon matrix causes significant volume expansion (>300%) and contraction. This can result in rapid pulverization of the silicon into small particles and electrical disconnection from the current collector.

The industry has recently turned its attention to nano- or micro-structured silicon to reduce the pulverization problem, i.e., silicon in the form of spaced apart nano- or micro-wires, tubes, pillars, particles and the like. The theory is that making the structures nano-sized avoids crack propagation and spacing them apart allows more room for volume expansion, thereby enabling the silicon to absorb lithium with reduced stresses and improved stability compared to, for example, macroscopic layers of bulk silicon.

Despite research into structured silicon approaches, such batteries based solely on silicon have yet to make a large market impact due to unresolved problems. A significant issue is the manufacturing complexity and investment required to form these anodes. For example, US 2015/0325852 describes silicon made by first growing a silicon-based, non-conformal, porous layer on a nanowire template by plasma-enhanced chemical vapor deposition (PECVD) followed by deposition of a denser, conformal silicon layer using thermal chemical vapor deposition (CVD). Formation of silicon nanowires can be very sensitive to small perturbations in deposition conditions making quality control and reproducibility a challenge. Other methods for forming nano- or micro-structured silicon use etching of silicon wafers, which is time-consuming and wasteful. Further, the connection between silicon wires to a current collector may be fragile and the structures may be prone to break or abrade away when subjected to handling stresses needed to manufacture a battery.

SUMMARY

There remains a need for anodes for lithium-based energy storage devices such as Li-ion batteries that are easy to manufacture, robust to handling, high in charge capacity, and amenable to fast charging, for example, at least 1 C. These and other needs are addressed by the embodiments described herein.

In accordance with an embodiment of this disclosure, an anode for an energy storage device is provided that includes a current collector having an electrically conductive layer and a surface layer overlaying the electrically conductive layer; and a lithium storage layer overlaying the surface layer, where the surface layer includes a metal chalcogenide including at least one of sulfur or selenium.

The present disclosure provides anodes for energy storage devices that may have one or more of at least the following advantages relative to conventional anodes: improved stability at aggressive ≥1 C charging rates; higher overall areal charge capacity; higher charge capacity per gram of silicon; improved physical durability; simplified manufacturing process; and more reproducible manufacturing process.

DETAILED DESCRIPTION

It is to be understood that the drawings are for purposes of illustrating the concepts of the disclosure and may not be to scale. Various aspects of anodes of the present disclosure, including deposition of lithium storage material, additional layers and methods are described in co-pending U.S. patent application Ser. Nos. 16/285,842, 16/909,008, 16/991,613, 16/991,623, and 16/991,626, the entire contents of which are incorporated by reference for all purposes.

Anode Overview

Figure 1:
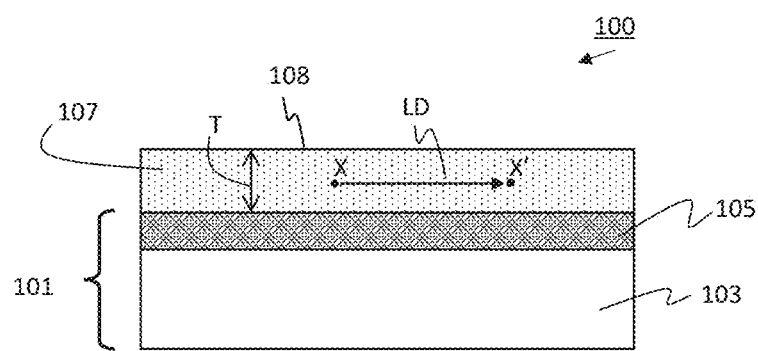
FIG. 1 is a cross-sectional view of an anode according to some embodiments of the present disclosure.

FIG. 1 is a cross-sectional view according to some embodiments of the present disclosure. Anode 100 includes an electrically conductive current collector 101 and a lithium storage layer 107. In this embodiment, the electrically conductive current collector 101 includes a surface layer 105 provided over an electrically conductive layer 103. In some embodiments, as discussed later, the surface layer 105 may include a metal chalcogenide material having at least one of sulfur or selenium, optionally both sulfur and selenium. In some embodiments, the electrically conductive layer 103 may be an electrically conductive metal layer. The lithium storage layer 107 may be provided over surface layer 105. In some embodiments, the top surface 108 of the lithium storage layer 107 may corresponds to a top surface of anode 100. In some embodiments the lithium storage layer 107 is in physical contact with the surface layer 105. In some embodiments, the active material of the lithium storage layer may extend partially into the surface layer. In some embodiments the continuous porous lithium storage layer includes a material capable of forming an electrochemically reversible alloy with lithium. In some embodiments, the lithium storage layer is a continuous and/or porous lithium storage layer (e.g., a continuous porous lithium storage layer, discussed in more detail later). In some embodiments, the lithium storage layer, optionally a continuous and/or porous lithium storage layer, may include silicon, germanium, tin, or alloys thereof. In some embodiments the lithium storage layer, optionally a continuous and/or porous lithium storage layer, includes at least 40 atomic % silicon, germanium, or a combination thereof. In some embodiments, the lithium storage layer, optionally a continuous and/or porous lithium storage layer, may be provided by a chemical vapor deposition (CVD) process including, but not limited to, a hot-wire CVD, or a plasma-enhanced chemical vapor deposition (PECVD). In some embodiments, the CVD lithium storage layer deposition may reduce a portion of the surface layer to form metal. In some embodiments, the lithium storage layer, optionally a continuous and/or porous lithium storage layer may be provided by a physical vapor deposition (PVD) process including but not limited to sputtering, e-beam, and evaporation methods.

Figure 2:
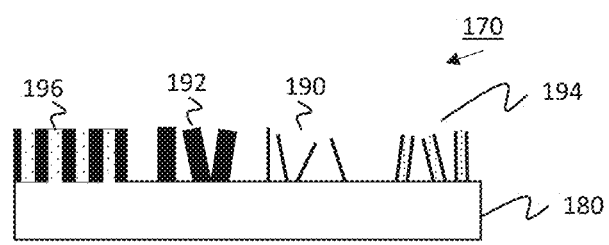
FIG. 2 is a cross-sectional view of a prior art anode having nanostructures.

In the present disclosure, the lithium storage layer is substantially free of nanostructures, e.g., in the form of spaced-apart wires, pillars, tubes or the like, or in the form of regular, linear vertical channels extending through the lithium storage layer. FIG. 2 shows a cross-sectional view of a prior art anode 170 that includes some non-limiting examples of nanostructures, such as nanowires 190, nanopillars 192, nanotubes 194 and nanochannels 196 provided over a current collector 180. The term "nanostructure" herein generally refers to an active material structure (for example, a structure of silicon, germanium or their alloys) having at least one cross-sectional dimension that is less than about 2,000 nm, other than a dimension approximately normal to an underlying substrate (such as a layer thickness) and excluding dimensions caused by random pores and channels. Similarly, the terms "nanowires", "nanopillars" and "nanotubes" refers to wires, pillars and tubes, respectively, at least a portion of which, have a diameter of less than 2,000 nm. "High aspect ratio" nanostructures have an aspect ratio greater than 4:1, where the aspect ratio is generally the height or length of a feature (which may be measured along a feature axis aligned at an angle of 45 to 90 degrees relative to the underlying current collector surface) divided by the width of the feature (which may be measured generally orthogonal to the feature axis). In some embodiments, the lithium storage layer is considered "substantially free" of nanostructures when the anode has an average of fewer than 10 nanostructures per 1600 square microns (in which the number of nanostructures is the sum of the number of nanowires, nanopillars, and nanotubes in the same unit area), such nanostructures having an aspect ratio of 4:1 or higher. Alternatively, there is an average of fewer than 1 such nanostructures per 1600 square micrometers. In some embodiments, the current collector may have a high surface roughness or the surface layer may include nanostructures, but these features are separate from the lithium storage layer.

In some embodiments, deposition conditions are selected in combination with the surface layer so that the lithium storage layers are relatively smooth providing an anode with diffuse or total reflectance of at least 10% at 550 nm, alternatively at least 20% (measured at the lithium storage layer side). In some embodiments, the anode may have lower reflectance than cited above, for example, by providing a current collector having a rough surface or by modifying deposition conditions of the lithium storage layer.

The anode can be a continuous foil or sheet but may alternatively be a mesh or have some other 3-dimensional structure. In some embodiments, the anode is flexible.

Figure 3:
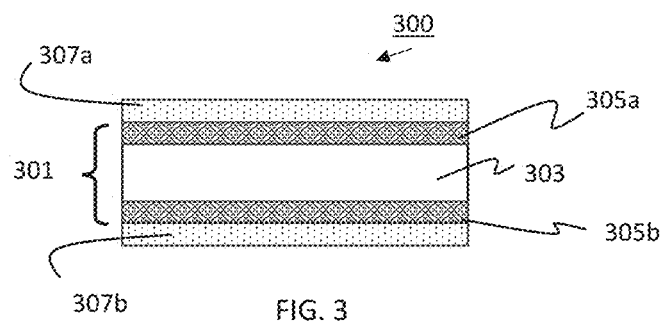
FIG. 3 is a cross-sectional view of an anode according to some embodiments of the present disclosure.

In some embodiments as shown in FIG. 3, the current collector 301 includes electrically conductive layer 303 and surface layers (305a, 305b) deposited on either side of the electrically conductive layer 303 and lithium storage layers (307a, 307b) are disposed on both sides to form anode 300. Surface layers 305a and 305b may be the same or different with respect to composition, thickness, porosity, or some other property. Similarly, lithium storage layers 307a and 307b may be the same or different with respect to composition, thickness, porosity, or some other property.

Figure 4:
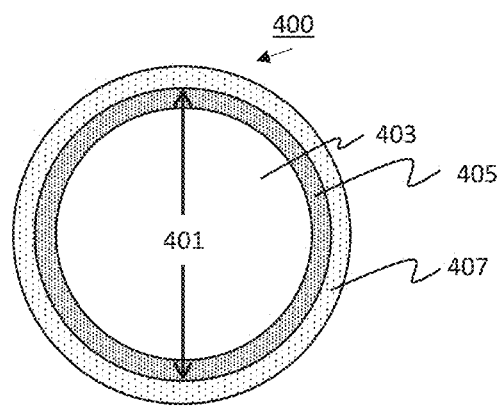
FIG. 4 is a cross-sectional view of an anode according to some embodiments of the present disclosure.

In some embodiments, the current collector has a mesh structure and a representative cross section is shown in FIG. 4. Current collector 401 includes surface layer 405 substantially surrounding the inner, electrically conductive core 403, e.g., a wire forming part of the mesh, the core acting as an electrically conductive layer. A continuous porous lithium storage layer 407 is provided over the surface layer to form anode 400. The mesh can be formed from interwoven wires or ribbons of metal or conductive carbon, formed by patterning holes into a substrate, e.g., a metal or metal-coated sheet, or any suitable method known in the art.

Current Collector

Current collector (101, 301, 401) includes at least one surface layer (105, 305, 405), and may further include a separate electrically conductive layer (103, 303, 403). In some embodiments, the electrically conductive layer includes a metallic material, e.g., titanium (and its alloys), nickel (and its alloys), copper (and its alloys), or stainless steel. In some embodiments, the electrically conductive layer includes an electrically conductive carbon, such as carbon black, graphene, graphene oxide, and graphite. In some embodiments the electrically conductive layer may be in the form of a foil or sheet of conductive material, or alternatively a layer deposited onto an insulating substrate. In some embodiments the electrically conductive layer may have a conductivity of at least $10^3$ S/m, or alternatively at least $10^6$ S/m, or alternatively at least $10^7$ S/m, and may include inorganic or organic conductive materials or a combination thereof.

In some embodiments, the electrically conductive layer has an average thickness of at least 0.1 µm, alternatively at least 1 µm, alternatively at least 5 µm. In some embodiments, the electrically conductive substrate has an average thickness in a range of 0.1 µm to 1 µm, alternatively 1 µm to 2 µm, alternatively 2 µm to 5 µm, alternatively 5 µm, to 10 µm, alternatively 10 µm to 15 µm, alternatively 15 µm to 20 μm, alternatively 20 μm to 3 μm, alternatively 30 μm to 50 μm, alternatively 50 μm to 100 μm, or any combination of contiguous ranges thereof.

The metal chalcogenide material includes at least one of sulfur or selenium, and in some embodiments may include both. The metal chalcogenide material may include a metal sulfide, a metal polysulfide, a metal selenide, or a metal polyselenide, or a mixture thereof. A metal sulfide may generally refer to a compound where the metal is associated with a sulfur atom in the form of $S^{2-}$. A metal polysulfide may generally refer to a compound where the metal is associated with a chain of sulfur atoms in the form of $S_n^{2-}$ where n≥2. Similarly, a metal selenide may generally refer to a compound where the metal is associated with a selenium atom in the form of $Se^{2-}$. A metal polyselenide may generally refer to a compound wherein the metal is associated with a chain of selenium atoms in the form of $Se_n^{2-}$ where n≥2. In some embodiments, metal chalcogenides may have complex structures. In some embodiments, the metal chalcogenide may include a mixture of sulfur- and selenium-containing moieties. In the present disclosure, a surface layer may be considered to include: a metal sulfide so long as it includes a metal and least one identifiable $S^{2-}$ species; or a metal selenide so long as it includes a metal and at least one identifiable $Se^{2-}$ species; or a metal polysulfide so long as it includes a metal and at least one identifiable $S_n^{2-}$ species with n≥2; or a metal polyselenide so long as it includes a metal and at least one identifiable $Se_n^{2-}$ species with n≥2. A metal chalcogenide including $(S_mSe_p)^{2-}$ where m and p are each at least 1, may be referred to as either a metal polysulfide or a polyselenide for the purposes of this disclosure.

The chalcogenide may include a stoichiometric or non-stoichiometric mixture of elements with respect to the metal oxidation state. The surface layer may include a mixture of metal chalcogenides having homogeneously or heterogeneously distributed sulfur or selenium, mixtures of metals, or mixtures of metal oxidation states. In some embodiments, the metal chalcogenide material may include a transition metal sulfide, a transition metal polysulfide, a transition metal selenide, a transition metal polyselenide, or mixture thereof. The transition metal may be a single transition metal or a mixture of transition metals. In some embodiments, the metal chalcogenide material may include at least one of Ti, V, Cr, Mn, Fe, Co, Ni, Cu, Zn, Ga, or In.

In some embodiments, the metal chalcogenide material may include a copper sulfide, a copper polysulfide, a copper selenide, a copper polyselenide, or a mixture thereof. The copper of the metal chalcogenide material may have an oxidation state of (I), (II), or a mixture of both. In some embodiments, the surface layer may include a copper chalcogenide according to formula 1:

$$Cu_x[S_mSe_p] \tag{1}$$

where 1≤x≤2, (m+p)≥1, and the average oxidation state of Cu=2/x. In some embodiments, a surface layer may include a copper chalcogenide of formula (1) in addition to some Cu(0) metal.

In some embodiments, the surface layer may further include one or more metal oxides. The metal element of the metal oxide may be the same as that of the metal chalcogenide or different. In some embodiments, the metal oxide may be a transition metal oxide. In some embodiments, the metal oxide may include one or more of Ti, V, Cr, Mn, Fe, Co, Ni Cu, Zn, Ga, or In. In some embodiments, the metal oxide may include lithium, optionally in addition to another metal. In some embodiments, the surface layer may include a homogeneous or heterogeneous mixture of one or more metal chalcogenides with one or more metal oxides.

In some embodiments, the surface layer may include an oxygen-containing copper chalcogenide having the formula 2:

$$Cu_x[(S_mSe_p)_yO_{(1-y)}] \tag{2}$$

where 1≤x≤2, (m+p)≥1, 0<y<1, and the average oxidation state of Cu=2/x.

Figure 5:
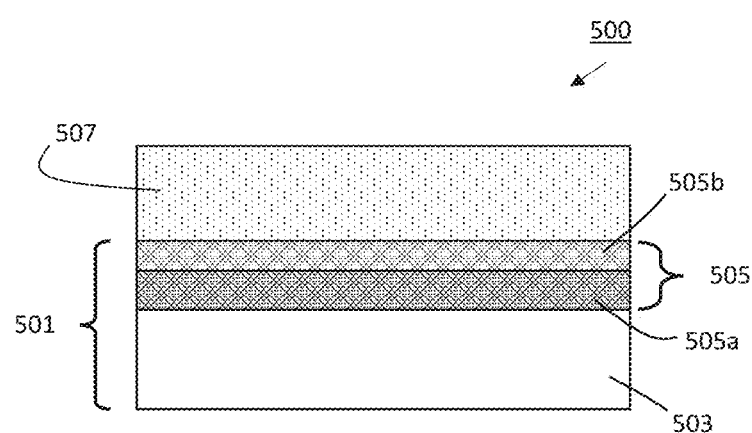
FIG. 5 is a cross-sectional view of an anode according to some embodiments of the present disclosure.

In some embodiments, the surface layer may include two or more sublayers differing in chemical compositions. In some embodiments, the surface layer may include two or more sublayers, at least one of which includes a metal chalcogenide having at least one of sulfur or selenium. For example, as shown in FIG. 5, anode 500 is similar to anode 100 and includes an electrically conductive current collector 501 and a lithium storage layer 507. The electrically conductive current collector 501 includes surface layer 505 provided over an electrically conductive layer 503. Surface layer 505 includes a first surface sublayer 505a overlaying the electrically conductive layer 503 and a second surface sublayer 505b overlaying the first surface sublayer 505a. The second surface sublayer 505b is interposed between the first surface sublayer 505a and the lithium storage layer 507 In some embodiments, at least one surface sublayer includes a sulfur- or selenium-containing metal chalcogenide and one surface sublayer includes a metal oxide, e.g., a transition metal oxide. In some embodiments, a first surface sublayer 505a including a sulfur- or selenium-containing metal chalcogenide is disposed in contact with the electrically conductive layer 503 and a second surface sublayer 505b including a metal oxide is provided over the first sublayer 505a and in contact with the lithium storage layer 507. In some embodiments, the second surface sublayer having the metal oxide is thinner than the first surface sublayer. In some embodiments, the current collector may include a metallic copper foil, and a surface layer may include a first surface sublayer of a copper sulfide or a copper polysulfide in contact with the copper foil and a second surface sublayer of titanium dioxide over first sublayer. In some embodiments, the first surface sublayer may include a metal oxide and the second surface sublayer may include a metal chalcogenide having at least one of sulfur or selenium.

In some embodiments, the surface layer may include a metal chalcogenide wherein the metal includes a mixture of a transition metal and lithium.

In embodiments using an electrically conductive layer, the surface layer should be sufficiently electrically conductive (e.g., is at least semi-conducting, or non-insulating) to allow transfer of electrical charge between the electrically conductive layer and the lithium storage layer. The surface layer may include dopants that promote electrical conductivity.

In some embodiments, the surface layer has an average thickness of at least 0.002 μm, alternatively at least 0.005 μm, alternatively at least 0.0010 μm, alternatively at least 0.0020 μm, alternatively at least 0.050 μm, alternatively 0.1 μm, alternatively at least 0.2 μm, alternatively at least 0.5 μm. In some embodiments, the surface layer has an average thickness in a range of about 0.002 μm to about 10 μm, alternatively, in a range of about 0.002 μm to about 0.010 μm, alternatively, in a range of about 0.0010 μm to about 0.050 μm, alternatively, in a range of about 0.005 μm to about 0.10 μm, alternatively, in a range of about 0.10 μm to about 0.20 μm, alternatively in a range of about 0.20 μm to about 0.50 μm, alternatively, in a range of about 0.50 μm to about 1.0 μm, alternatively, in a range of about 1.0 μm to about 2.0 μm, alternatively, in a range of about 2.0 μm to about 5.0 µm, alternatively, in a range of about 5.0 µm to about 10 µm, or any combination of contiguous ranges thereof.

In some embodiments, a surface sublayer that includes a metal oxide may have an average thickness of at least 0.002 µm, alternatively at least 0.005 µm, alternatively at least 0.010 µm, alternatively at least 0.020 µm, alternatively at least 0.050 µm, alternatively 0.1 µm, alternatively at least 0.2 µm, alternatively at least 0.5 µm. In some embodiments, the surface sublayer that includes a metal oxide may have an average thickness in a range of about 0.002 µm to about 0.0010 µm, alternatively, in a range of about 0.002 µm to about 0.005 µm, alternatively, in a range of about 0.005 µm to about 0.01 µm, alternatively, in a range of about 0.0010 µm to about 0.050 µm, alternatively, in a range of about 0.050 µm to about 0.1 µm, alternatively, in a range of about 0.1 µm to about 0.5 µm, alternatively, in a range of about 0.5 µm to about 1.0 µm, alternatively, in a range of about 1.0 µm to about 2.0 µm, or any combination of contiguous ranges thereof.

In some embodiments, the surface layer or sublayer is formed directly by atomic layer deposition (ALD), CVD, evaporation, or sputtering.

In some embodiments, the electrically conductive layer is a metal layer and the surface layer may be formed by treating a portion of the electrically conductive metal layer with an agent to form the metal chalcogenide, wherein at least some of metal chalcogenide includes the metal(s) of the electrically conductive layer. In some non-limiting examples, the reagent may be applied: a) as a vapor, e.g., vaporized sulfur; b) from a reduced pressure system, e.g., sulfur from a sulfur-valved cracker (VCC) effusion cell; c) from a solution, e.g., liver of sulfur solution, or a solution including one or more of a polysulfide salt, a thiosulfate salt, or a polyselenide salt; d) by contact with a reactive sulfur- or selenium-containing solid; or) by electrochemical reaction in a solution comprising a sulfur or selenium source. Treating may further include a heating step.

In some embodiments, a metal oxide precursor layer is first formed on the electrically conductive layer and then treated to form the surface layer. The metal oxide precursor layer may include a precursor that includes a metal oxide. The precursor may then be converted to the metal chalcogenide. In some embodiments, the metal oxide precursor layer may be formed by a PVD process, a CVD process, or an ALD process. In some embodiments, the metal oxide precursor layer may be formed by partial oxidation of the electrically conductive (metal) layer, for example, by thermal oxidation in air or chemical or electrochemical oxidation in a solution. In some embodiments the metal oxide precursor layer may be formed from a metal oxide precursor composition. Some non-limiting examples of metal oxide precursor compositions include sol-gels (metal alkoxides), metal carbonates, metal acetates (including organic acetates), metal hydroxides and metal oxide dispersions. The metal oxide precursor composition may be thermally treated to form the metal oxide precursor layer. Some or all of the metal oxide precursor layer may be treated to cause sulfurization or selenization to form the metal chalcogenide material, for example, a metal sulfide, a metal polysulfide, a metal selenide, or a metal polyselenide. In some embodiments, treatment of the metal oxide precursor layer includes treatment with a solution, e.g., one including one or more of a sulfide salt, a polysulfide salt, a thiosulfate salt, a selenide salt, or a polyselenide salt. Treating may further include a heating step. In some embodiments, not all of the metal oxide of the metal oxide precursor layer is converted and the surface layer may further include some metal oxide.

In some embodiments, a surface layer precursor composition may be coated or printed over the electrically conductive layer 103 then treated to form surface layer 105. A few non-limiting examples of metal chalcogenide precursor compositions include sulfide- or selenide-sols, and sulfur- or selenide-containing organometallic compounds. Treating may further include a heating step.

In some embodiments as mentioned above, forming the metal chalcogenide may include a thermal treatment. Such treatment may include exposure to a temperature of at least 50° C., alternatively in a range of 50° C. to 150° C., alternatively in a range of 150° C. to 250° C., alternatively in a range of 250° C. to 350° C., alternatively in a range of 350° C. to 450° C., or any combination of these ranges. Thermal treatment time depends on many factors, but may optionally be at least 0.1 minute, alternatively in a range of 1 to 240 minutes, to form the desired surface layer. In some embodiments, thermal treatment may be carried out using an oven, a tube furnace, infrared heating elements, contact with a hot plate or exposure to a flash lamp. In some embodiments, treatment may include exposure to reduced pressure to form the metal chalcogenide, e.g., to drive off solvents or volatile reaction products. The reduced pressure may be less than 100 Torr, alternatively in a range of 0.1 to 100 Torr. Exposure time to the reduced pressure may optionally be at least 0.1 minute, alternatively in a range of 1 to 240 minutes. In some embodiments, both reduced pressure and thermal treatment may be used. In some embodiments, the reduced pressure or thermal treatment may initiate chemical reactions, drive off solvents, or remove reaction byproducts.

In some embodiments, the metal chalcogenide may be provided in a pattern over the electrically conductive layer in a manner analogous to that disclosed in U.S. patent application Ser. No. 16/909,008 for metal oxides, the entire contents of which are incorporated herein.

The current collector may have an electrically conductive layer that includes two or more sublayers differing in chemical composition. For example, the current collector may include metallic copper foil as a first electrically conductive sublayer with a second electrically conductive sublayer of metallic nickel provided over the copper, and a surface layer of a nickel chalcogenide over the metallic nickel. As mentioned previously, the metallic copper and nickel may be in the form of alloys.

Lithium Storage Layer

A lithium storage layer includes a material capable of reversibly incorporating lithium. A lithium storage layer may be porous. In some embodiments, a lithium storage layer may include silicon, germanium, tin, antimony, or a combination thereof. In some embodiments, a lithium storage layer is substantially amorphous. In some embodiments a lithium storage layer includes substantially amorphous silicon. Such substantially amorphous storage layers may include a small amount (e.g., less than 20 atomic %) of crystalline material dispersed therein. A lithium storage layer may include dopants such as hydrogen, boron, phosphorous, sulfur, fluorine, aluminum, gallium, indium, arsenic, antimony, bismuth, nitrogen, or metallic elements. In some embodiments a lithium storage layer may include porous substantially amorphous hydrogenated silicon (a-Si:H), having, e.g., a hydrogen content of from 0.1 to 20 atomic %, or alternatively higher. In some embodiments, a lithium storage layer may include methylated amorphous silicon. Note that, unless referring specifically to hydrogen content, any atomic % metric used herein for a lithium storage material or layer refers to all atoms other than hydrogen.

In some embodiments, a lithium storage layer includes at least 40 atomic % silicon, germanium or a combination thereof, alternatively at least 50 atomic %, alternatively at least 60 atomic %, alternatively at least 70 atomic %, alternatively, at least 80 atomic %, alternatively at least 90 atomic %. In some embodiments, a lithium storage layer includes at least 40 atomic % silicon, alternatively at least 50 atomic %, alternatively at least 60 atomic %, alternatively at least 70 atomic %, alternatively, at least 80 atomic %, alternatively at least 90 atomic %.

In some embodiments, a lithium storage layer includes less than 10 atomic % carbon, alternatively less than 5 atomic %, alternatively less than 2 atomic %, alternatively less than 1 atomic %. In some embodiments, a lithium storage layer includes less than 5% by weight of carbon-based binders, graphitic carbon, graphene, graphene oxide, reduced graphene oxide, carbon nanotubes, carbon black, and conductive carbon.

In some embodiments, a lithium storage layer may be a porous lithium storage layer that includes voids or interstices (pores), which may be random or non-uniform with respect to size, shape and distribution. Such porosity does not result in, or result from, the formation of any recognizable nanostructures such as nanowires, nanopillars, nanotubes, nanochannels or the like. In some embodiments, the pores are polydisperse. In some embodiments, when analyzed by SEM cross section, 90% of pores larger than 100 nm in any dimension are smaller than about 5 μm in any dimension, alternatively smaller than about 3 μm, alternatively smaller than about 2 μm. In some embodiments, the lithium storage layer may include some pores that are smaller than 100 nm in any dimension, alternatively smaller than 50 nm in any dimension, alternatively smaller than 20 nm in any dimension. In some embodiments the lithium storage layer has an average density in a range of 1.0-1.1 g/cm³, alternatively 1.1-1.2 g/cm³, alternatively 1.2-1.3 g/cm³, alternatively 1.3-1.4 g/cm³, alternatively 1.4-1.5 g/cm³, alternatively 1.5-1.6 g/cm³, alternatively 1.6-1.7 g/cm³, alternatively 1.7-1.8 g/cm³, alternatively 1.8-1.9 g/cm³, alternatively 1.9-2.0 g/cm³, alternatively 2.0-2.1 g/cm³, alternatively 2.1-2.2 g/cm³, alternatively 2.2-2.25 g/cm³, or any combination of contiguous ranges thereof, and includes at least 40 atomic % silicon, alternatively at least 50 atomic % silicon, alternatively at least 60 atomic % silicon, alternatively at least 70 atomic % silicon, alternatively 80 atomic % silicon, alternatively at least 90 atomic % silicon, alternatively at least 95 atomic % silicon.

In some embodiments, the lithium storage layer may be a continuous lithium storage layer. In some embodiments, the lithium storage layer may be both continuous and porous (a continuous porous lithium storage layer). The majority of active material (e.g., silicon, germanium, tin, antimony, or alloys thereof) of a continuous lithium storage layer has substantial lateral connectivity across portions of the current collector, such connectivity extending around random pores and interstices (in the case of a continuous porous lithium storage layer). Referring again to FIG. 1, in some embodiments, "substantial lateral connectivity" means that active material at one point X in the continuous lithium storage layer 107 may be connected to active material at a second point X' in the layer at a straight-line lateral distance LD that is at least as great as the thickness T of the continuous lithium storage layer, alternatively, a lateral distance at least 2 times as great as the thickness, alternatively, a lateral distance at least 3 times as great as the thickness. Not shown, the total path distance of material connectivity, including circumventing pores in the case of a continuous porous lithium storage layer, may be longer than LD. In some embodiments, the continuous lithium storage layer may be described as a matrix of interconnected silicon, germanium, or alloys thereof, and in the case of a continuous porous lithium storage layer, with random pores and interstices embedded therein. In some embodiments, the continuous porous lithium storage layer has a sponge-like form. In some embodiments, about 75% or more of the surface layer surface is contiguous with the first lithium storage layer, at least prior to electrochemical formation. It should be noted that a continuous lithium storage layer does not necessarily extend across the entire anode without any lateral breaks and may include random discontinuities or cracks and still be considered continuous.

In some embodiments, the lithium storage layer, optionally a continuous and/or porous lithium storage layer, includes a sub-stoichiometric oxide of silicon ($SiO_x$), germanium ($GeO_x$) or tin ($SnO_x$) wherein the ratio of oxygen atoms to silicon, germanium or tin atoms is less than 2:1, i.e., x<2, alternatively less than 1:1, i.e., x<1. In some embodiments, x is in a range of 0.02 to 0.95, alternatively 0.02 to 0.10, alternatively 0.10 to 0.50, or alternatively 0.50 to 0.95, alternatively 0.95 to 1.25, alternatively 1.25 to 1.50.

In some embodiments, the lithium storage layer, optionally a continuous and/or porous lithium storage layer, includes a sub-stoichiometric nitride of silicon ($SiN_y$), germanium ($GeN_y$), or tin ($SnN_y$) wherein the ratio of nitrogen atoms to silicon, germanium or tin atoms is less than 1.25:1, i.e., y<1.25. In some embodiments, y is in a range of 0.02 to 0.95, alternatively 0.02 to 0.10, alternatively 0.10 to 0.50, or alternatively 0.50 to 0.95, alternatively 0.95 to 1.25.

In some embodiments, the lithium storage layer, optionally a continuous and/or porous lithium storage layer, includes a sub-stoichiometric oxynitride of silicon ($SiO_xN_y$), germanium ($GeO_xN_y$), or tin ($SnO_xN_y$) wherein the ratio of total oxygen and nitrogen atoms to silicon, germanium or tin atoms is less than 1:1, i.e., (x+y)<1. In some embodiments, (x+y) is in a range of 0.02 to 0.95, alternatively 0.02 to 0.10, alternatively 0.10 to 0.50, or alternatively 0.50 to 0.95.

In some embodiments, the above sub-stoichiometric oxides, nitrides, or oxynitrides may be provided by a CVD process, including, but not limited to, a PECVD process. The oxygen and nitrogen may be provided uniformly within the lithium storage layer, or alternatively the oxygen or nitrogen content may be varied as a function of storage layer thickness.

Figure 6:
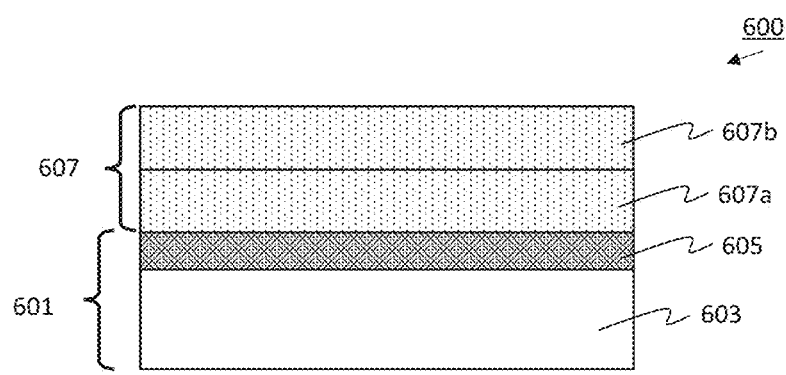
FIG. 6 is a cross-sectional view of an anode according to some embodiments of the present disclosure.

In some embodiments, the lithium storage layer may include two or more sublayers, optionally continuous and/or porous lithium storage sublayers. For example, referring to FIG. 6, the lithium storage layer 607 of anode 600 may include a plurality of lithium storage sublayers (607a and 607b) having different physical properties or chemical compositions, and independently selected from any of the embodiments discussed above. Anode 600 includes a current collector 601 including surface layer 605 disposed over electrically conductive layer 603. Lithium storage sublayer 607a is disposed over surface layer 605 and lithium storage sublayer 607b is disposed over lithium storage sublayer 607a. For example, lithium storage sublayer 607a may include amorphous silicon with low oxygen content and lithium storage sublayer 607b may include a suboxide of silicon, $SiO_x$, with x in a range of 0.02 to 0.95. Alternatively, the compositions of 607a and 607b could be reversed. In another example, lithium storage sublayer 607a may include amorphous silicon with low germanium and lithium storage sublayer 607b includes a higher atomic % germanium than 607a. In some embodiments, the sublayers may have different amounts or types of dopants. In some other embodiments, lithium storage sublayers 607a and 607b have similar chemical compositions, but the density of 607a is higher than 607b. These are just a few non-limiting examples. In some embodiments, the second lithium storage layer includes sublayers, or both the first and second lithium storage layers include sublayers. Many other combinations are possible. Although two sublayers are shown in FIG. 6, three or more sublayers may instead be used. In some embodiments, the sublayers may have different lithium storage capacities in units of mAh/g or mAh/cm$^2$. In some embodiments, lithium storage sublayer 607a has a higher lithium storage capacity than the upper lithium layer(s) such as lithium storage sublayer 607b. In some embodiments, lithium storage sublayer 607a has a lower lithium storage capacity than the upper lithium layer(s) such as lithium storage sublayer 607b.

In some embodiments, the lithium storage layer, optionally a continuous and/or porous lithium storage layer, includes a gradient of components, density, or porosity, or a combination thereof, as a function of layer thickness. For example, the lithium storage layer may include amorphous silicon having a density higher near the surface layer than further away from the surface layer, or vice versa.

The thickness or mass per unit area of the lithium storage layer (optionally continuous and/or porous) depends on the storage material, desired charge capacity and other operational and lifetime considerations. Increasing the thickness typically provides more capacity. If the lithium storage layer becomes too thick, electrical resistance may increase and the stability may decrease. In some embodiments, the anode may be characterized as having an active silicon areal density of at least 0.5 mg/cm$^2$, alternatively at least 1.0 mg/cm$^2$, alternatively at least 1.5 mg/cm$^2$, alternatively at least 3 mg/cm$^2$, alternatively at least 5 mg/cm$^2$. In some embodiments, the lithium storage structure may be characterized as having an active silicon areal density in a range of 0.5-1.5 mg/cm$^2$, alternatively 1.5-2 g/cm$^2$, alternatively in a range of 2-3 mg/cm$^2$, alternatively in a range of 3-5 mg/cm$^2$, alternatively in a range of 5-10 mg/cm$^2$, alternatively in a range of 10-15 mg/cm$^2$, alternatively in a range of 15-20 mg/cm$^2$, or any combination of contiguous ranges thereof "Active areal silicon density" refers to the silicon in electrical communication with the current collector that is available for reversible lithium storage at the beginning of cell cycling, e.g., after anode "electrochemical formation" discussed later. "Areal" of this term refers to the surface area of the electrically conductive layer over which active silicon is provided. In some embodiments, not all of the silicon content is active silicon, i.e., some may be tied up in the form of non-active silicides or electrically isolated from the current collector.

In some embodiments the lithium storage has an average thickness of at least 0.5 μm, alternatively at least 1 μm, alternatively at least 3 μm, alternatively at least 7 μm. In some embodiments, the lithium storage layer (optionally continuous and/or porous) has an average thickness in a range of about 0.5 μm to about 50 μm. In some embodiments, the lithium storage layer (optionally continuous and/or porous) comprises at least 85 atomic % amorphous silicon and has a thickness in a range of 0.5 to 1 μm, alternatively 1-2 μm, alternatively 2-4 μm, alternatively 4-7 μm, alternatively 7-10 μm, alternatively 10-15 μm, alternatively 15-20 μm, alternatively 20-25 μm, alternatively 25-30 μm, alternatively 30-40 μm, alternatively 40-50 μm, or any combination of contiguous ranges thereof.

In some embodiments, the lithium storage layer (optionally continuous and/or porous) includes silicon but does not contain a substantial amount of crystalline silicides, i.e., the presence of silicides is not readily detected by X-Ray Diffraction (XRD). Metal silicides, e.g., nickel silicide, commonly form when silicon is deposited at higher temperatures directly onto metal, e.g., nickel foil. Metal silicides such as nickel silicides often have much lower lithium storage capacity than silicon itself. In some embodiments, the average atomic % of silicide-forming metallic elements within the lithium storage layer are on average less than 35%, alternatively less than 20%, alternatively less than 10%, alternatively less than 5%. In some embodiments, the average atomic % of silicide-forming metallic elements within the lithium storage layer are in a range of about 0.01% to about 10%, alternatively about 0.05 to about 5%. In some embodiments, the atomic % of silicide forming metallic elements in the lithium storage layer is higher nearer the current collector than away from the current collector.

Additional Lithium Storage Layers

The generally planar nature of some embodiments of the present anode further allows simple coating of additional lithium storage layers that are not continuous porous lithium storage layers as described herein. For example, conventional lithium-ion battery slurries based on carbon that may optionally further include silicon particles, may be coated over the continuous porous lithium storage layer of the present disclosure to further enhance charge capacity. Coating methods may include curtain coating, slot coating, spin coating, ink jet coating, spray coating or any other suitable method.

CVD

CVD generally involves flowing a precursor gas, a gasified liquid in terms of direct liquid injection CVD or gases and liquids into a chamber containing one or more objects, typically heated, to be coated. Chemical reactions occur on and near the hot surfaces, resulting in the deposition of a thin film on the surface. This is accompanied by the production of chemical by-products that are exhausted out of the chamber along with unreacted precursor gases. As would be expected with the large variety of materials deposited and the wide range of applications, there are many variants of CVD that may be used to form the lithium storage layer, the metal oxide layer, an intermediate layer, a supplemental layer (see below) or some other layer. It may be done in hot-wall reactors or cold-wall reactors, at sub-torr total pressures to above-atmospheric pressures, with and without carrier gases, and at temperatures typically ranging from 100-1600° C. in some embodiments. There are also a variety of enhanced CVD processes, which involve the use of plasmas, ions, photons, lasers, hot filaments, or combustion reactions to increase deposition rates and/or lower deposition temperatures. Various process conditions may be used to control the deposition, including but not limited to, temperature, precursor material, gas flow rate, pressure, substrate voltage bias (if applicable), and plasma energy (if applicable).

As mentioned, the lithium storage layer (optionally continuous and/or porous), e.g., a layer of silicon or germanium or both, may be provided by plasma-enhanced chemical vapor deposition (PECVD). Relative to conventional CVD, deposition by PECVD can often be done at lower temperatures and higher rates, which can be advantageous for higher manufacturing throughput. In some embodiments, the PECVD is used to deposit a substantially amorphous silicon layer (optionally doped) over the metal oxide layer. In some embodiments, PECVD is used to deposit a substantially amorphous continuous porous silicon layer over the metal oxide layer.

PECVD

In PECVD processes, according to various implementations, a plasma may be generated in a chamber in which the substrate is disposed or upstream of the chamber and fed into the chamber. Various types of plasmas may be used including, but not limited to, capacitively-coupled plasmas, inductively-coupled plasmas, and conductive coupled plasmas. Any appropriate plasma source may be used, including DC, AC, RF, VHF, combinatorial PECVD and microwave sources may be used. Some non-limiting examples of useful PECVD tools include hollow cathode tube PECVD, magnetron confined PECVD, inductively coupled plasma chemical vapor deposition (ICP-PECVD, sometimes called HDPECVD, ICP-CVD or HDCVD), and expanding thermal plasma chemical vapor deposition (ETP-PECVD).

PECVD process conditions (temperatures, pressures, precursor gases, carrier gasses, dopant gases, flow rates, energies, and the like) can vary according to the particular process and tool used, as is well known in the art In some implementations, the PECVD process is an expanding thermal plasma chemical vapor deposition (ETP-PECVD) process. In such a process, a plasma generating gas is passed through a direct current arc plasma generator to form a plasma, with a web or other substrate including the current collector optionally in an adjoining vacuum chamber. A silicon source gas is injected into the plasma, with radicals generated. The plasma is expanded via a diverging nozzle and injected into the vacuum chamber and toward the substrate. An example of a plasma generating gas is argon (Ar). In some embodiments, the ionized argon species in the plasma collide with silicon source molecules to form radical species of the silicon source, resulting in deposition onto the current collector. Example ranges for voltages and currents for the DC plasma source are 60 to 80 volts and 40 to 70 amperes, respectively.

Any appropriate silicon source may be used to deposit silicon, including silane ($SiH_4$), dichlorosilane ($H_2SiCl_2$), monochlorosilane ($H_3SiCl$), trichlorosilane ($HSiCl_3$), silicon tetrachloride ($SiCl_4$), and diethylsilane. Depending on the gas(es) used, the silicon layer may be formed by decomposition or reaction with another compound, such as by hydrogen reduction. In some embodiments, the gases may include a silicon source such as silane, a noble gas such as helium, argon, neon, or xenon, optionally one or more dopant gases, and substantially no hydrogen. In some embodiments, the gases may include argon, silane, and hydrogen, and optionally some dopant gases. In some embodiments the gas flow ratio of argon relative to the combined gas flows for silane and hydrogen is at least 3.0, alternatively at least 4.0. In some embodiments, the gas flow ratio of argon relative to the combined gas flows for silane and hydrogen is in a range of 3-5, alternatively 5-10, alternatively 10-15, alternatively 15-20, or any combination of contiguous ranges thereof. In some embodiments, the gas flow ratio of hydrogen gas to silane gas is in a range of 0-0.1, alternatively 0.1-0.2, alternatively 0.2-0.5, alternatively 0.5-1, alternatively 1-2, alternatively 2-5, or any combination of contiguous ranges thereof. In some embodiments, higher porosity silicon may be formed and/or the rate of silicon deposition may be increased when the gas flow ratio of silane relative to the combined gas flows of silane and hydrogen increases. In some embodiments a dopant gas is borane or phosphine, which may be optionally mixed with a carrier gas. In some embodiments, the gas flow ratio of dopant gas (e.g., borane or phosphine) to silicon source gas (e.g., silane) is in a range of 0.0001-0.0002, alternatively 0.0002-0.0005, alternatively 0.0005-0.001, alternatively 0.001-0.002, alternatively 0.002-0.005, alternatively 0.005-0.01, alternatively 0.01-0.02, alternatively 0.02-0.05, alternatively 0.05-0.10, or any combination of contiguous ranges thereof. Such gas flow ratios described above may refer to the relative gas flow, e.g., in standard cubic centimeter per minute (SCCM). In some embodiments, the PECVD deposition conditions and gases may be changed over the course of the deposition.

In some embodiments, the temperature at the current collector during at least a portion of the time of PECVD deposition is in a range of 100° C. to 200° C., alternatively 200° C. to 300° C., alternatively 300° C. to 400° C., alternatively 400° C. to 500° C., alternatively 500° C. to 600° C., alternatively 600° C. to 700° C. or any combination of contiguous ranges thereof. In some embodiments, the temperature may vary during the time of PECVD deposition. For example, the temperature during early times of the PECVD may be higher than at later times. Alternatively, the temperature during later times of the PECVD may be higher than at earlier times.

Other Anode Features

Figure 7:
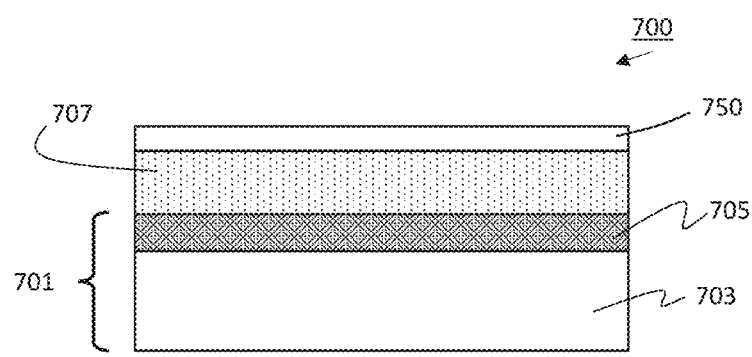
FIG. 7 is a cross-sectional view of an anode according to some embodiments of the present disclosure.

The current collector may include one or more features to ensure that a reliable electrical connection can be made. In some embodiments, a supplemental layer 750 is provided over the surface of the lithium storage layer, to form anode 700 as shown in FIG. 7. In addition to supplemental layer 750, anode 700 includes an electrically conductive current collector 701 and a lithium storage layer 707. The electrically conductive current collector 701 includes a surface layer 705 provided over an electrically conductive layer 703. In some embodiments, the supplemental layer is a protection layer to enhance lifetime or physical durability. The supplemental layer may be an oxide or nitride formed from the lithium storage material itself, e.g., silicon dioxide, silicon nitride, or silicon oxynitride in the case of silicon. A supplemental layer may be deposited, for example, by ALD, CVD, PECVD, evaporation, sputtering, solution coating, ink jet or any method that is compatible with the anode. In some embodiments, a supplemental layer is deposited in the same CVD or PECVD device as the lithium storage layer. For example, stoichiometric silicon dioxide or silicon nitride supplemental layer by be formed by introducing an oxygen- or nitrogen-containing gas (or both) along with the silicon precursor gas used to form the lithium storage layer. In some embodiments the supplemental layer may include boron nitride or silicon carbide. In some embodiments, a supplemental layer may include a metal compound as described below.

In some embodiments, the one or more supplemental layers may help stabilize the lithium storage layer by providing a barrier to direct electrochemical reactions with solvents or electrolytes that can degrade the interface. A supplemental layer should be reasonably conductive to lithium ions and permit lithium ions to move into and out of the lithium storage layer during charging and discharging. In some embodiments, the lithium ion conductivity of a supplemental layer is at least $10^{-9}$ S/cm, alternatively at least $10^{-8}$ S/cm, alternatively at least $10^{-7}$ S/cm, alternatively at least $10^{-6}$ S/cm. In some embodiments, the supplemental layer acts as a solid-state electrolyte. In some embodiments, the supplemental layer(s) are less electrically conductive than the lithium storage structure so that little or no electrochemical reduction of lithium ions to lithium metal occurs at the supplemental layer/electrolyte interface. In addition to providing protection from electrochemical reactions, a multiple supplemental layer structure embodiments may provide superior structural support. In some embodiments, although the supplemental layers may flex and may form fissures when the lithium storage layer expands during lithiation, crack propagation can be distributed between the layers to reduce direct exposure of the lithium storage structure to the bulk electrolyte. For example, a fissure in the second supplemental layer may not align with a fissure in the first supplemental layer. Such an advantage may not occur if just one thick supplemental layer is used. In an embodiment, the second supplemental layer may be formed of a material having higher flexibility than the first supplemental layer.

In some embodiments, a supplemental layer may include silicon nitride, e.g., substantially stoichiometric silicon nitride where the ratio of nitrogen to silicon is in a range of 1.33 to 1.25. A supplemental layer comprising silicon nitride may have an average thickness in a range of about 0.5 nm to 1 nm, alternatively 1 nm to 2 nm, alternatively 2 nm to 10 nm, alternatively 10 nm to 20 nm, alternatively 20 nm to 30 nm, alternatively 30 nm to 40 nm, alternatively 40 nm to 50 nm, or any combination of contiguous ranges thereof. Silicon nitride may be deposited by an atomic layer deposition (ALD) process or by a CVD process. In some embodiments, the lithium storage layer includes silicon deposited by some type of CVD process as described above, and at the end, a nitrogen gas source is added to the CVD deposition chamber along with the silicon source.

In some embodiments, a supplemental layer may include silicon dioxide, e.g., substantially stoichiometric silicon dioxide where the ratio of oxygen to silicon is in a range of 2.0 to 1.9. A supplemental layer comprising silicon dioxide may have an average thickness in a range of about 2 nm to 10 nm, alternatively 10 nm to 30 nm, alternatively 30 nm to 50 nm, alternatively 50 nm to 70 nm, alternatively 70 nm to 100 nm, alternatively 100 nm to 150 nm, alternatively 150 nm to 200 nm, or any combination of contiguous ranges thereof. Silicon dioxide may be deposited by an atomic layer deposition (ALD) process or by a CVD process. In some embodiments, the lithium storage layer includes silicon deposited by some type of CVD process as described above, and at the end, an oxygen-containing gas source is added to the CVD deposition chamber along with the silicon source.

In some embodiments, a supplemental layer may include silicon oxynitride, e.g., a substantially stoichiometric oxynitride of silicon ($SiO_xN_y$) wherein the sum of 0.5x and 0.75y is in a range of 1.00 to 0.95. A supplemental layer comprising silicon nitride may have an average thickness in a range of about 0.5 nm to 1 nm, alternatively 1 nm to 2 nm, alternatively 2 nm to 10 nm, alternatively 10 nm to 20 nm, alternatively 20 nm to 30 nm, alternatively 30 nm to 40 nm, alternatively 40 nm to 50 nm, alternatively 50 nm to 70 nm, alternatively 70 nm to 100 nm, alternatively 100 nm to 150 nm, or any combination of contiguous ranges thereof. In some embodiments, silicon oxynitride may be provided by a CVD process, including but not limited to, a PECVD process. The oxygen and nitrogen may be provided uniformly within the lithium storage layer, or alternatively the oxygen or nitrogen content may be varied as a function of position (e.g., height) within the storage layer.

In some embodiments, silicon nitride, silicon dioxide, or silicon oxynitride may be deposited by an atomic layer deposition (ALD) process or by a CVD process. In some embodiments, the lithium storage layer includes silicon deposited by some type of CVD process as described above, and at the end, a nitrogen- and/or an oxygen-containing gas source is added to the CVD deposition chamber along with the silicon source.

In some embodiments a supplemental layer may include a metal compound. In some embodiments, the metal compound includes a metal oxide, metal nitride, or metal oxynitride, e.g., those containing aluminum, titanium, vanadium, zirconium, or tin, or mixtures thereof. In some embodiments, a supplemental layer including a metal oxide, metal nitride, or metal oxynitride, may have an average thickness of less than about 100 nm, for example, in a range of about 0.5 nm to about 1 nm, alternatively about 1 nm to about 2 nm, alternatively 2 nm to 10 nm, alternatively 10 nm to 20 nm, alternatively 20 nm to 30 nm, alternatively 30 nm to 40 nm, alternatively 40 nm to 50 nm, or any combination of contiguous ranges thereof. The metal oxide, metal nitride, or metal oxynitride may include other components or dopants such as transition metals, phosphorous or silicon.

In some embodiments, the metal compound may include a lithium-containing material such as lithium phosphorous oxynitride (LIPON), a lithium phosphate, a lithium aluminum oxide, or a lithium lanthanum titanate. In some embodiments, the thickness of supplemental layer including a lithium-containing material may be in a range of 0.5 nm to 200 nm, alternatively 1 nm to 10 nm, alternatively 10 nm to 20 nm, alternatively 20 nm to 30 nm, alternatively 30 nm to 40 nm, alternatively 40 nm to 50 nm, alternatively 50 nm to 100 nm, alternatively 100 to 200 nm, or any combination of contiguous ranges thereof.

In some embodiments the metal compound may be deposited by a process comprising ALD, thermal evaporation, sputtering, or e-beam evaporation. ALD is a thin-film deposition technique typically based on the sequential use of a gas phase chemical process. The majority of ALD reactions use at least two chemicals, typically referred to as precursors. These precursors react with the surface of a material one at a time in a sequential, self-limiting, manner. Through the repeated exposure to separate precursors, a thin film is deposited, often in a conformal manner. In addition to conventional ALD systems, so-called spatial ALD (SALD) methods and materials can be used, e.g., as described U.S. Pat. No. 7,413,982, the entire contents of which are incorporated by reference herein for all purposes. In certain embodiments, SALD can be performed under ambient conditions and pressures and have higher throughput than conventional ALD systems.

In some embodiments, the process for depositing the metal compound may include electroless deposition, contact with a solution, contact with a reactive gas, or electrochemical methods. In some embodiments, a metal compound may be formed by depositing a metallic layer (including but not limited to thermal evaporation, CVD, sputtering, e-beam evaporation, electrochemical deposition, or electroless deposition) followed by treatment to convert the metal to the metal compound (including but not limited to, contact with a reactive solution, contact with an oxidizing agent, contact with a reactive gas, or a thermal treatment).

The supplemental layer may include an inorganic-organic hybrid structure having alternating layers of metal oxide and bridging organic materials. These inorganic-organic hybrid structures are sometimes referred to as "metalcone". Such structures can be made using a combination of atomic layer deposition to apply the metal compound and molecular layer deposition (MLD) to apply the organic. The organic bridge is typically a molecule having multiple functional groups. One group can react with a layer comprising a metal compound and the other group is available to react in a subsequent ALD step to bind a new metal. There is a wide range of reactive organic functional groups that can be used including, but not limited to hydroxy, carboxylic acid, amines, acid chlorides and anhydrides. Almost any metal compound suitable for ALD deposition can be used. Some non-limiting examples include ALD compounds for aluminum (e.g., trimethyl aluminum), titanium (e.g., titanium tetrachloride), zinc (e.g., diethyl zinc), and zirconium (tris (dimethylamino)cyclopentadienyl zirconium). For the purposes of the present disclosure, this alternating sublayer structure of metal oxide/bridging organic is considered a single supplemental layer of metalcone. When the metal compound includes aluminum, such structures may be referred to as an alucone. Similarly, when the metal compound includes zirconium, such structures may be referred to as a zircone. Further examples of inorganic-organic hybrid structures that may be suitable as a supplemental layer may be found in U.S. Pat. No. 9,376,455, and US patent publications 2019/0044151 and 2015/0072119, the entire contents of which are incorporated herein by reference.

In some embodiments, a supplemental layer having a metalcone may have a thickness in a range of 0.5 nm to 200 nm, alternatively 1 nm to 10 nm, alternatively 10 nm to 20 nm, alternatively 20 nm to 30 nm, alternatively 30 nm to 40 nm, alternatively 40 nm to 50 nm, alternatively 50 nm to 100 nm, alternatively 100 to 200 nm, or any combination of contiguous ranges thereof.

In some embodiments a supplemental layer (a first, a second, or an additional supplemental layer) may include boron nitride or silicon carbide and may have an average thickness of less than about 100 nm, for example, in a range of about 0.5 nm to about 1 nm, alternatively about 1 nm to about 2 nm, alternatively 2 nm to 10 nm, alternatively 10 nm to 20 nm, alternatively 20 nm to 30 nm, alternatively 30 nm to 40 nm, alternatively 40 nm to 50 nm, or any combination of contiguous ranges thereof.

In some embodiments the anode is at least partially pre-lithiated, i.e., the lithium storage layer and/or surface layer includes some lithium prior to battery assembly, that is, prior to combining the anode with a cathode in a battery cell. Note that "lithiated storage layer" simply means that at least some of the potential storage capacity of the lithium storage layer is filled, but not necessarily all. In some embodiments, the lithiated storage layer may include lithium in a range of 1% to 10% of the theoretical lithium storage capacity of the lithium storage layer, alternatively 10% to 20%, alternatively, 20% to 30%, alternatively 30% to 40%, alternatively 40% to 50%, alternatively 50% to 60%, alternatively 60% to 70%, alternatively 70% to 80%, alternatively 80% to 90%, alternatively 90% to 100%, or any combination of contiguous ranges thereof. In some embodiments, the surface layer material may capture some of the lithium, and one may need to account for such capture to achieve the desired lithium range in the lithiated storage layer.

In some embodiments prelithiation may include depositing lithium metal over the lithium storage layer, e.g., by evaporation, e-beam or sputtering. Alternatively, prelithiation may include contacting the anode with a reductive lithium organic compound, e.g., lithium naphthalene, n-butyllithium or the like. In some embodiments, prelithiation may include incorporating lithium by electrochemical reduction of lithium ion in prelithiation solution.

In some embodiments, prelithiation includes physical contact of the lithium storage layer with a lithiation material. The lithiation material may include a reducing lithium compound, lithium metal or a stabilized lithium metal powder, any of which may optionally be provided as a coating on a lithium transfer substrate. The lithium transfer substrate may include a metal (e.g., as a foil), a polymer, a ceramic, or some combination of such materials, optionally in a multilayer format. In some embodiments, such lithiation material may be provided on at least one side of a current separator that faces the anode, i.e., the current separator also acts as a lithium transfer substrate. Stabilized lithium metal powders ("SLMP") typically have a phosphate, carbonate or other coating over the lithium metal particles, e.g. as described in U.S. Pat. Nos. 8,377,236, 6,911,280, 5,567,474, 5,776,369, and 5,976,403, the entire contents of which are incorporated herein by reference. In some embodiments SLMPs may require physical pressure to break the coating and allow incorporation of the lithium into the lithium storage layer. In some embodiments, other lithiation materials may be applied with pressure and/or heat to promote lithium transfer into the lithium storage layer, optionally through one or more supplemental layers. In some embodiments a pressure applied between an anode and a lithiation material may be at least 200 kPa, alternatively at least 1000 kPa, alternatively at least 5000 kPa. Pressure may be applied, for example, by calendering, pressurized plates, or in the case of a lithiation material coating on a current separator, by assembly into battery having confinement or other pressurizing features.

In some embodiments, prelithiation includes thermally treating the lithium storage layer during lithium incorporation, after lithium incorporation, or both during and after. The thermal treatment may assist in the incorporation of the lithium into the lithium storage layer, for example by promoting lithium diffusion. In some embodiments, thermally treating includes exposing the anode to a temperature in a range of 50° C. to 100° C., alternatively 100° C. to 150° C., alternatively 150° C. to 200° C., alternatively 200° C. to 250° C., alternatively 250° C. to 300° C., or alternatively 300° C. to 350° C. In some embodiments, thermal treatment may be done under controlled atmosphere, e.g., under vacuum or argon atmosphere to avoid unwanted reactions with oxygen, nitrogen, water or other reactive gases.

In some embodiments, prelithiation may soften the lithium storage layer, for example, due to the formation of a lithium-silicon alloy. This softening may cause problems in some processes, for example, roll-to-roll processes whereby the softened lithium storage layer begins to stick to rollers or to itself during winding. In some embodiments providing at one or more supplemental layers prior to prelithiation or after prelithiation, the structural integrity and processability of the anode may be substantially improved. In some embodiments, the supplemental layer(s) may act as a harder interface with other surfaces to prevent or reduce contact of such surfaces with the softened lithium storage material.

In some embodiments, lithium metal may be deposited over the lithium storage layer followed by deposition of lithium ion-conducting layer. The anode may be thermally treated prior to deposition of the lithium ion-conducting layer, after deposition of the lithium ion-conducting layer, or both. In some embodiments, the lithium metal is deposited directly onto the lithium storage layer. In some embodiments, a supplemental layer, e.g., silicon nitride, is deposited onto the lithium storage layer prior to deposition of the lithium metal. In some embodiments, the lithium ion-conducting layer may include a lithium-containing material, a metal oxide, or a metalcone. Some non-limiting examples of lithium ion-conducting layer materials include a lithium phosphorous oxynitride (UPON), a lithium phosphate, a lithium aluminum oxide, a lithium lanthanum titanate, and alucones. The lithium ion-conducting layer may include multiple sublayers of different materials, e.g., selected from the above list.

In some embodiments, the anode may be treated with a reducing agent prior to final battery assembly. The reducing agent may have an electrochemical potential sufficient to reduce at least a portion of the metal chalcogenide. The reducing agent may include an inorganic hydride, a substituted or unsubstituted borohydride, an amine-borane, or an anionic organic aromatic compound. In some embodiments, the reducing agent may be provided in a non-aqueous solvent that is itself not reduced by the reducing agent and applied under controlled conditions having low oxygen and moisture.

Thermal treatments were discussed above with respect to prelithiation and the surface layer, but in some embodiments the anode may be thermally treated prior to battery assembly (after deposition of the lithium storage coating is complete, but before the anode is combined with a cathode in a battery cell), with or without a prelithiation step. In some embodiments, thermally treating the anode may improve adhesion of the various layers, improve charge capacity, improve charging rates, or improve electrical conductivity. In some embodiments, thermally treating the anode may be done in a controlled environment, e.g., under vacuum, argon, or nitrogen having a low oxygen and water content (e.g., less than 100 ppm or partial pressure of less than 10 Torr, alternatively less than 1 Torr, alternatively less than 0.1 Torr to prevent degradation). Herein, "under vacuum" generally refers to a reduced pressure condition wherein the total pressure of all gasses (e.g. in a vacuum oven) is less than 10 Torr. Due to equipment limitations, the vacuum pressure is typically greater than about $10^{-8}$ Torr. In some embodiments, anode thermal treatment may be carried out using an oven, a tube furnace, infrared heating elements, contact with a hot surface (e.g. a hot plate), or exposure to a flash lamp. The anode thermal treatment temperature and time depend on the materials of the anode. In some embodiments, anode thermal treatment includes heating the anode to a temperature of at least 50° C., optionally in a range of 50° C. to 600° C., alternatively 100° C. to 250° C., alternatively 250° C. to 350° C., alternatively 350° C. to 450° C., alternatively 450° C. to 600° C., alternatively 600° C. to 700° C., alternatively 700° C. to 800° C., or any combination of contiguous ranges thereof. In some embodiments, the anode thermal treatment time may be in a range of about 0.1 min to about 1 min, alternatively about 1 min to about 5 mins, alternatively about 5 mins to about 10 mins, alternatively about 10 mins to about 30 minutes, alternatively about 30 mins to about 60 mins, alternatively about 60 mins to about 90 mins, alternatively in a range of about 90 mins to about 120 mins, or any combination of contiguous ranges thereof.

Figure 8:
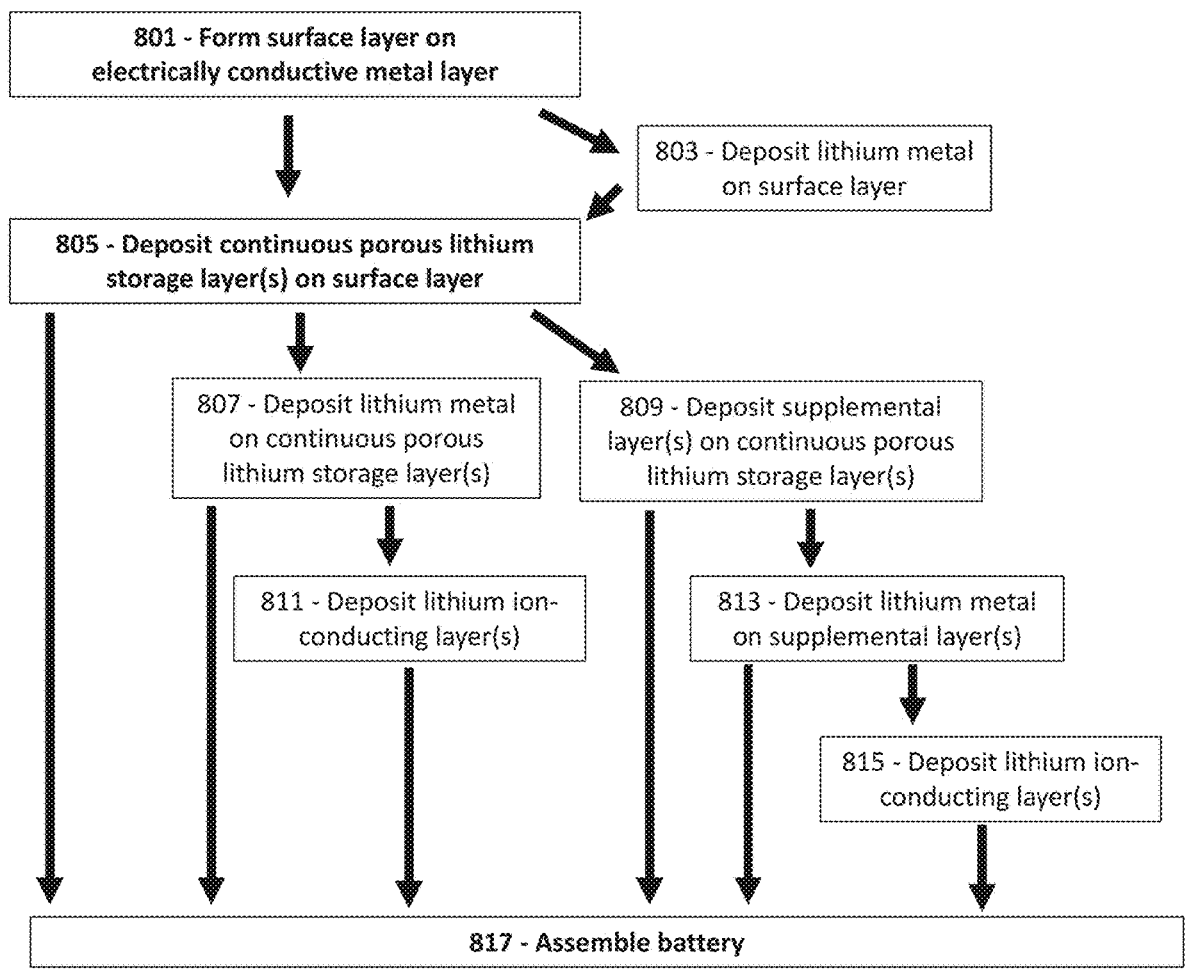
FIG. 8 is a process flow diagram for preparing anodes according to some embodiments of the present disclosure.

As illustrated in FIG. 8, there are numerous process flow options for fabricating anodes of the present disclosure. All of the steps of FIG. 8 have been discussed in more detail above and FIG. 8 is not an exhaustive list of all possibilities. In some embodiments, at least Steps 801, 805 and 817 are required. In Step 801, a surface layer is formed on an electrically conductive layer, e.g., an electrically conductive metal layer such as a metal foil or metal mesh. In Step 805, one or more lithium storage layers are deposited over or onto the surface layer. In an alternative embodiment, prior to step 805, lithium metal may be deposited onto the surface layer as shown in Step 803. In some cases, the anode formed in Step 805 may be ready for assembly into a battery, Step 817.

In some embodiments, after Step 805, a prelithiation step may be included, e.g., Step 807 where lithium metal may be deposited onto the lithium storage layer(s). In some cases, the anode from Step 807 may be ready to be assembled into a battery, Step 817. In other embodiments as shown in Step 811, one or more lithium ion-conducting layer(s) may be deposited onto the product of Step 807 prior to battery assembly Step 817.

In some embodiments, after Step 805, one or more supplemental layers may be deposited onto the lithium storage layer(s), as shown in Step 809. In some cases, the anode from Step 809 may be ready for assembly into a battery, Step 817. In other embodiments, a prelithiation step may be included, e.g. as shown in Step 813 where lithium metal may be deposited over or onto the supplemental layer(s). In some cases, the anode from Step 813 may be ready for assembly into a battery, Step 817. In other embodiments, one or more lithium ion-conducting layer(s) may be deposited onto the product of Step 813 prior to battery assembly Step 817.

In addition to the explicit steps shown in FIG. 8, thermal treatments or other treatments may be performed between any of the steps. Further, as mentioned, additional lithium storage layers that are not lithium storage layers may be coated after Step 805. In some embodiments one or more steps may be performed using roll-to-roll coating methods wherein the electrically conductive layer is in the form of a rolled film, e.g., a roll of metal foil.

Figure 9A:
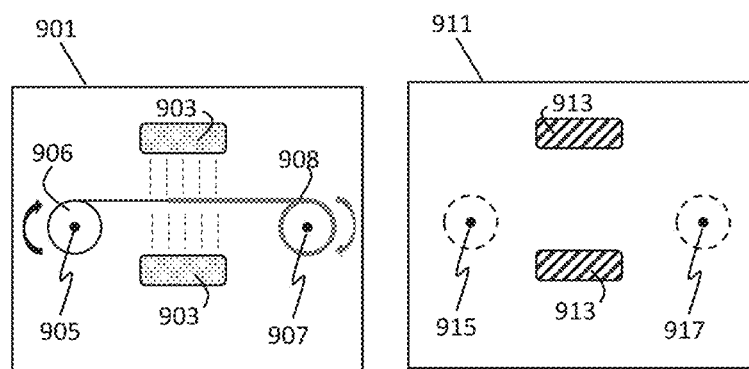
FIG. 9A is a schematic of apparatuses for roll-to-roll processing of anodes according to some embodiments of the present disclosure.

In some cases, as shown in schematic FIG. 9A, the roll-to-roll processing may performed within a particular step wherein the apparatus 901 for such step includes the necessary processing hardware 903, e.g., for depositing, forming or treating a layer, along with a loading tool 905 for holding a roll of film 906 to be processed, and a winding tool 907 to roll up the processed film 908 after the step is complete. To carry out the next step, the processed roll may be transferred to processing apparatus 911, having its own processing hardware 913, loading tool 915, and winding tool 917. During transfer, the rolls may be kept in a controlled environment, e.g., low oxygen or moisture, depending on the step.

Figure 9B:
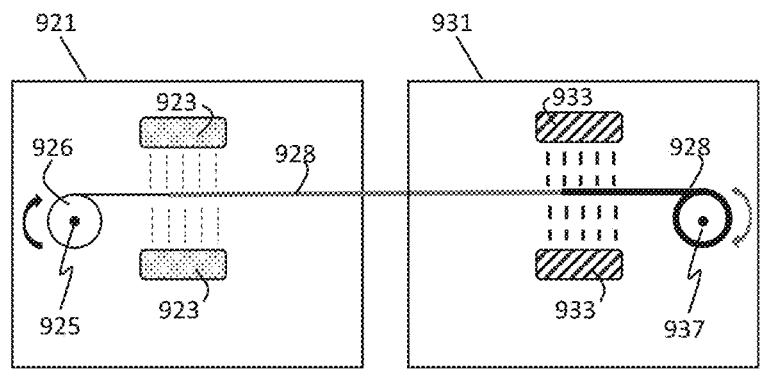
FIG. 9B is a schematic of apparatuses for roll-to-roll processing of anodes according to another embodiment of the present disclosure.

In some cases, the roll-to-roll processing may include transfer of the film processed in one step directly to the next step or apparatus as shown schematically in FIG. 9B. Processing apparatus 921 is analogous to apparatus 901, but without the winding tool. Apparatus 921 includes loading tool 925 for holding the roll of film 926 to be processed and appropriate processing hardware 923, e.g., for depositing, forming or treating a layer. The processed film 928 from the first step moves to processing apparatus 931 to receive another process step. Apparatus 931 includes the appropriate processing hardware 933, e.g., for depositing, forming, or treating a layer, and a winding tool 937 to roll up the processed film 938 after the next step is complete. Not shown, the processed film 938 may instead move to yet another processing apparatus without winding. Also, while drawn as separate units, in some embodiments apparatus 921 and apparatus 931 may share a common chamber. In some embodiments, a transition chamber or zone may be provided between apparatus 921 and 931 designed to avoid contamination of one process with another, or to act as a film transport speed buffer if one process requires less time than another.

Various combinations of the above embodiments may be employed together, depending on the compatibility of one apparatus interfacing with another. Fabrication equipment may further include slitting stations.

Battery Features

The preceding description relates primarily to the anode/negative electrode of a lithium-ion battery (LIB). The LIB typically includes a cathode/positive electrode, an electrolyte and a separator (if not using a solid-state electrolyte). Batteries can be formed into multilayer stacks of anodes and cathodes with an intervening separator. Alternatively, a single anode/cathode stack can be formed into a so-called jelly-roll. Such structures are provided into an appropriate housing having desired electrical contacts.

In some embodiments, the battery may be constructed with confinement features to limit expansion of the battery, e.g., as described in US published applications 2018/0145367 and 2018/0166735, the entire contents of which are incorporated herein by reference. In some embodiments a physical pressure is applied between the anode and cathode, e.g., using a tensioned spring or clip, a compressible film or the like. Confinement, pressure or both may help ensure that the anode remains in active contact with the current collector during formation and cycling, which may cause expansion and contraction of the lithium storage layer.

Figure 10:
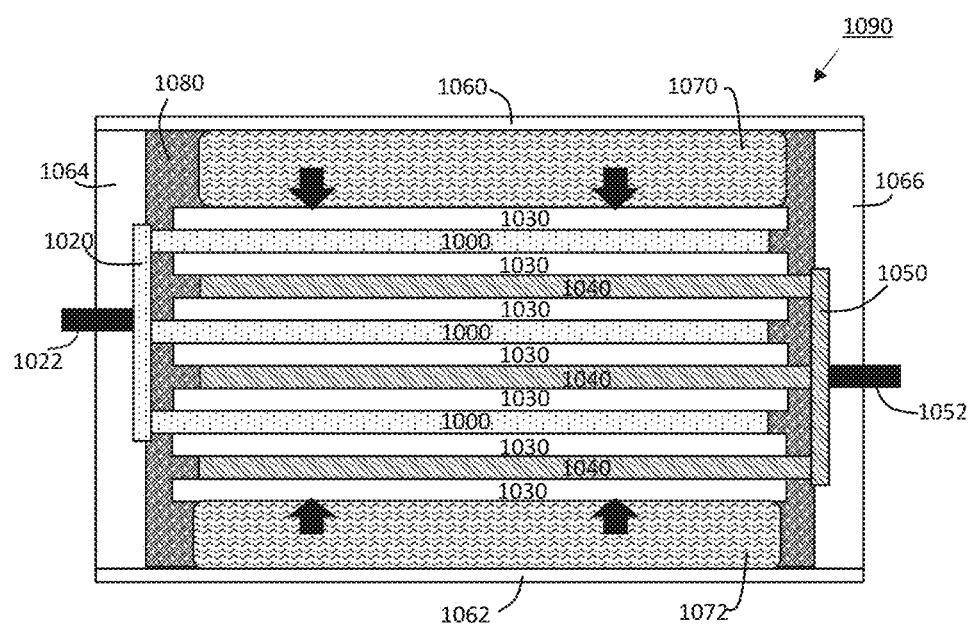
FIG. 10 is a cross-sectional view of a battery according to some embodiments of the present disclosure.

FIG. 10 is a schematic cross-sectional view of a battery according to some embodiments of the present disclosure. Battery 1090 includes top plate 1060, bottom plate 1062, anode side plate 1064, and cathode side plate 1066, which form part of a housing for the stack of anodes 1000, cathodes 1040, and intervening separators 1030. Anodes are attached to an anode bus 1020 which is connected to anode lead 1022 that extends through anode side plate 1064. Cathodes are attached to a cathode bus 1050 which is connected to cathode lead 1052 that extends through cathode side plate 1066. Battery 1090 further includes electrolyte 1080 which fills the space and saturates the separators 1030. Top compression member 1070 and lower compression member 1072 apply physical pressure (arrows) between the anodes and cathodes. Compression members may be compressible films, e.g., made from a porous polymer or silicone. Alternatively, compression members may include an array of compressible features, e.g., made from porous polymer or silicone. Alternatively, the compression members may include springs or an array of springs. Alternatively, compression members may correspond to two sides of a compression clip or clamp. In some embodiments, the separator may act as a compressible film. In some embodiments the top and bottom plates may be formed a material and/or structured to resist deformation thereby confining battery swell.

Cathode

Positive electrode (cathode) materials include, but are not limited to, lithium metal oxides or compounds (e.g., $LiCoO_2$, $LiFePO_4$, $LiMnO_2$, $LiNiO_2$, $LiMn_2O_4$, $LiCoPO_4$, $LiNi_xCo_yMn_zO_2$, $LiNi_xCo_yAl_zO_2$, $LiFe_2(SO_4)_3$, or $Li_2FeSiO_4$), carbon fluoride, metal fluorides such as iron fluoride ($FeF_3$), metal oxide, sulfur, selenium, sulfur-selenium and combinations thereof. Cathode active materials are typically provided on, or in electrical communication with, an electrically conductive cathode current collector.

In some embodiments, a prelithiated anode of the present disclosure is used with cathode including sulfur, selenium, or both sulfur and selenium (collectively referred to herein as "chalcogen cathodes"). In some embodiments, a prelithiated anode of the present disclosure may be paired with a chalcogen cathode having an active material layer, wherein the active material layer may include a carbon material and a compound selected from the group consisting of Se, $Se_yS_x$, $Te_yS_x$, $Te_zSe_yS_x$, and combinations thereof, where x, y and z are any value between 0 and 1, the sum of y and x being 1, and the sum of z, y and x being 1, the compound impregnated in the carbon material, e.g., as described in US published application 2019/0097275, which is incorporated by reference herein for all purposes. The compound may be present in an amount of 9-90% by weight based on the total weight of the active material layer. In some embodiments, the chalcogen cathode active material layer further includes conductive carbon nanotubes to improve overall conductivity and physical durability and may permit faster charging and discharging. The presence of carbon nanotubes may further allow thicker coatings that have greater flexibility thereby allowing higher capacity.

Chalcogen cathodes are generally paired with lithium metal anodes. However, lithium metal anodes are difficult to handle, prone to degradation, and may further allow formation of dangerous dendritic lithium that can lead to catastrophic shorts. In some embodiments, prelithiated anodes of the present disclosure can achieve equivalent energy storage capacity of a pure lithium anode, but are much easier to handle and less prone to form dendritic lithium, thus making them more compatible with chalcogen cathodes.

Current Separator

The current separator allows ions to flow between the anode and cathode but prevents direct electrical contact. Such separators are typically porous sheets. Non-aqueous lithium-ion separators are single layer or multilayer polymer sheets, typically made of polyolefins, especially for small batteries. Most commonly, these are based on polyethylene or polypropylene, but polyethylene terephthalate (PET) and polyvinylidene fluoride (PVDF) can also be used. For example, a separator can have >30% porosity, low ionic resistivity, a thickness of ~10 to 50 μm and high bulk puncture strengths. Separators may alternatively include glass materials, ceramic materials, a ceramic material embedded in a polymer, a polymer coated with a ceramic, or some other composite or multilayer structure, e.g., to provide higher mechanical and thermal stability. As mentioned, the separator may include a lithiation material such as lithium metal, a reducing lithium compound, or an SLMP material coated at least on the side facing the anode.

Electrolyte

The electrolyte in lithium ion cells may be a liquid, a solid, or a gel. A typical liquid electrolyte comprises one or more solvents and one or more salts, at least one of which includes lithium. During the first few charge cycles (sometimes referred to as formation cycles), the organic solvent and/or the electrolyte may partially decompose on the negative electrode surface to form an SEI (Solid-Electrolyte-Interphase) layer. The SEI is generally electrically insulating but ionically conductive, thereby allowing lithium ions to pass through. The SEI may lessen decomposition of the electrolyte in the later charging cycles.

Some non-limiting examples of non-aqueous solvents suitable for some lithium ion cells include the following: cyclic carbonates (e.g., ethylene carbonate (EC), fluoroethylene carbonate (FEC), propylene carbonate (PC), butylene carbonate (BC) and vinylethylene carbonate (VEC)), vinylene carbonate (VC), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC, also commonly abbreviated EMC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitriles (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), organic compounds containing an S=O group (e.g., dimethyl sulfone and divinyl sulfone), and combinations thereof.

Non-aqueous liquid solvents can be employed in combination. Examples of these combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In some embodiments, a cyclic carbonate may be combined with a linear ester. Moreover, a cyclic carbonate may be combined with a lactone and a linear ester. In some embodiments, the weight ratio, or alternatively the volume ratio, of a cyclic carbonate to a linear ester is in a range of 1:9 to 10:1, alternatively 2:8 to 7:3

A salt for liquid electrolytes may include one or more of the following non-limiting examples: $LiPF_6$, $LiBF_4$, $LiClO_4$, $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3$ (iso-$C_3F_7)_3$, $LiPF_5$(iso-$C_3F_7$), lithium salts having cyclic alkyl groups (e.g., $(CF_2)_2(SO_2)_{2x}Li$ and $(CF_2)_3(SO_2)_{2x}Li$), and combinations thereof. Common combinations include: $LiPF_6$ and $LiBF_4$; $LiPF_6$ and $LiN(CF_3SO_2)_2$; and $LiBF_4$ and $LiN(CF_3SO_2)_2$.

In some embodiments, the total concentration of salt in a liquid non-aqueous solvent (or combination of solvents) is at least 0.3 M, alternatively at least 0.7M. The upper concentration limit may be driven by a solubility limit and operational temperature range. In some embodiments, the concentration of salt is no greater than about 2.5 M, alternatively no more than about 1.5 M.

In some embodiments, the battery electrolyte includes a non-aqueous ionic liquid and a lithium salt.

A solid-state electrolyte may be used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as polyvinylidene fluoride (PVDF) or chloride or copolymer of their derivatives, poly(chlorotrifluoroethylene), poly(ethylene-chlorotrifluoro-ethylene), or poly(fluorinated ethylene-propylene), polyethylene oxide (PEO) and oxymethylene linked PEO, PEO-PPO-PEO crosslinked with trifunctional urethane, poly(bis(methoxy-ethoxy-ethoxide))-phosphazene (MEEP), triol-type PEO crosslinked with difunctional urethane, poly((oligo)oxyethylene)methacrylate-co-alkali metal methacrylate, polyacrylonitrile (PAN), polymethylmethacrylate (PMMA), polymethylacrylonitrile (PMAN), polysiloxanes and their copolymers and derivatives, acrylate-based polymer, other similar solvent-free polymers, combinations of the foregoing polymers either condensed or cross-linked to form a different polymer, and physical mixtures of any of the foregoing polymers. Other less conductive polymers that may be used in combination with the above polymers to improve the strength of thin laminates include: polyester (PET), polypropylene (PP), polyethylene naphthalate (PEN), polyvinylidene fluoride (PVDF), polycarbonate (PC), polyphenylene sulfide (PPS), and polytetrafluoroethylene (PTFE). Such solid polymer electrolytes may further include a small amount of organic solvents listed above. The polymer electrolyte may be an ionic liquid polymer. Such polymer-based electrolytes can be coated using any number of conventional methods such as curtain coating, slot coating, spin coating, inkjet coating, spray coating or other suitable method.

Additives may be included in the electrolyte to serve various functions. For example, additives such as polymerizable compounds having an unsaturated double bond may be added to stabilize or modify the SEI. Certain amines or borate compounds can act as cathode protection agents. Lewis acids can be added to stabilize fluorine-containing anion such as $PF_6^-$. Safety protection agents include those to protect overcharge, e.g., anisoles, or act as fire retardants, e.g., alkyl phosphates.

In some embodiments, a solid-state electrolyte may be vapor deposited, solution-coated, melt-coated or a combination thereof. Whether vapor deposited or coated from a solution or melt, embodiments of the present disclosure are advantageous over nanostructured devices. In the case of vapor deposited solid-state electrolytes, anodes of the present disclosure do not have the problem of physical "shadowing" that nano- or micro-structured devices do. Shadowing will create non-uniform deposition of the electrolyte. The anodes disclosed here generally do not have high aspect ratio structures as described above, resulting in no or low shadowing effects. Vapor deposited solid electrolytes can be deposited uniformly and rapidly over anodes of the present disclosure without resorting to slow atomic layer or other conformal coating methods. In the case of solution or melt-deposited solid-state electrolytes, anodes of the present disclosure may be more robust to the stresses and shear forces caused by the coating operation. High aspect ratio nano- or micro-structures are susceptible to breakage from such forces.

In some embodiments, the original, non-cycled anode may undergo structural or chemical changes during electrochemical charging/discharging, for example, from normal battery usage or from an earlier "electrochemical formation step". As is known in the art, an electrochemical formation step is commonly used to form an initial SEI layer and involves relatively gentle conditions of low current and limited voltages. The modified anode prepared in part from such electrochemical charging/discharging cycles may still have excellent performance properties, despite such structural and/or chemical changes relative to the original, non-cycled anode.

EXAMPLES

Comparative Anode

A copper foil without a surface layer was prepared simply by cleaning and wiping with isopropyl alcohol. The foil was placed in a high-density plasma-enhanced chemical vapor deposition tool (HDPECVD) using silane gas as the source of silicon and argon carrier gas. Attempts to form a layer of amorphous silicon resulted in a poorly adhered or non-adhered deposit that was unusable.

Anode 1 (Copper Sulfide Surface Layer)

Figure 11:
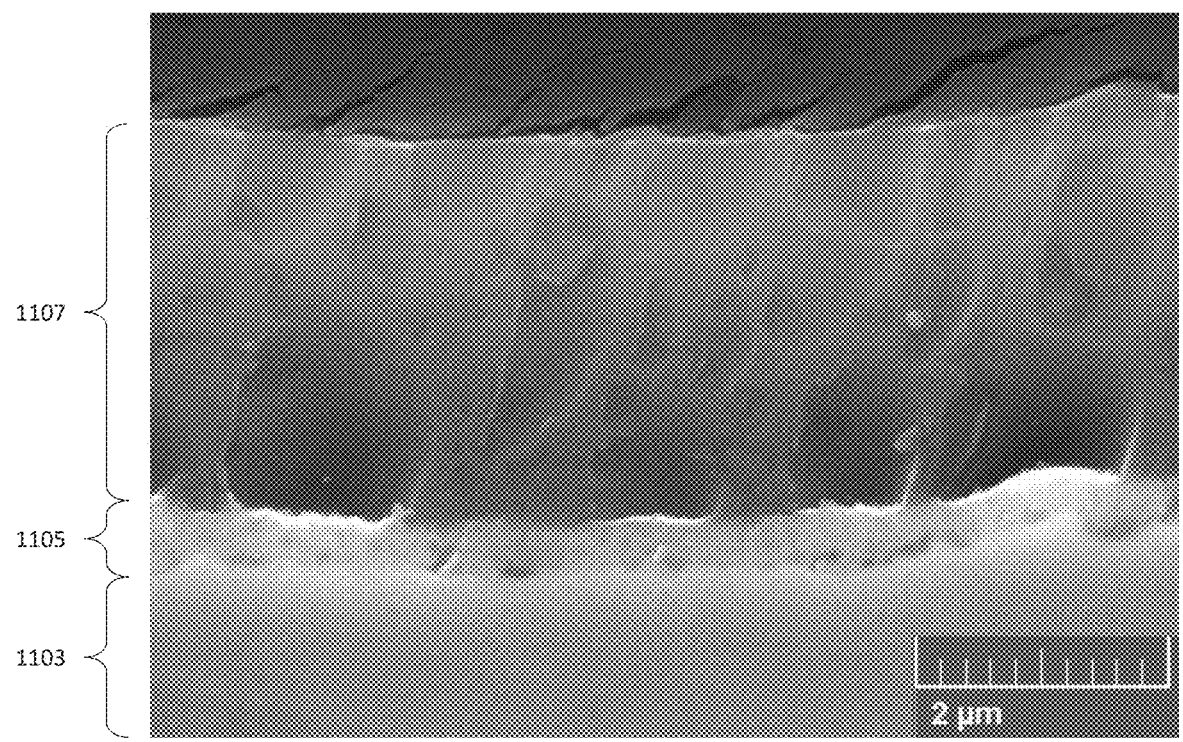
FIG. 11 is a cross-sectional SEM of an anode according to some embodiments of the present disclosure.

A cleaned copper foil was immersed in an aqueous liver of sulfur solution at room temperature until a surface layer including a copper sulfide formed having an average thickness of about 0.5 µm. The current collector was dipped in a solution of sodium bicarbonate to neutralize the liver of sulfur, rinsed in DI water, air-dried, and transferred to a high-density plasma-enhanced chemical vapor deposition tool (HDPECVD). Amorphous silicon was deposited over the surface layer at a loading of about 0.5 mg/cm² to form the lithium storage layer. FIG. 11 is an SEM cross section of Anode 1 showing a continuous porous amorphous silicon layer 1107, about 3 µm in thickness, overlaying the ~0.5 µm surface layer (a copper sulfide) 1105, which in turn, is overlaying the electrically conductive layer (copper metal foil) 1103.

Anode 2 (Rough Copper Sulfide/TiO₂ Surface Layer)

A clean copper foil was roughened using 600 grit silicon carbide sandpaper and immersed in an aqueous liver of sulfur solution at room temperature until a first surface sublayer including a copper sulfide formed over the roughened foil, the first surface sublayer having an average thickness of about 0.5 µm. The current collector was dipped in a solution of sodium bicarbonate to neutralize the liver of sulfur, rinsed in DI water, air-dried and transferred to an ALD tool where 50 nm or amorphous $TiO_2$ was deposited onto the copper sulfide, thereby forming a second surface sublayer. That is, the surface layer included copper sulfide and $TiO_2$ sublayers. Based on the method of making, there may also exist some copper oxide between the copper sulfide and $TiO_2$. The current collector was placed in a high-density plasma-enhanced chemical vapor deposition tool (HDPECVD). Amorphous silicon was deposited over the surface layer at a loading of about 0.8 mg/cm² to form the lithium storage layer.

Anode 3 (Copper Polysulfide/TiO₂ Surface Layer)

A clean copper foil was placed in a muffle furnace and the temperature was raised to between 200° C. and 225° C. in air for about 180 minutes and cooled back to room temperature. The partly oxidized foil was immersed in aqueous liver of sulfur solution at room temperature until a first surface sublayer including a copper polysulfide formed over the foil, the first surface sublayer having an average thickness of about 0.5 µm. The current collector was dipped in a solution of sodium bicarbonate to neutralize the liver of sulfur, rinsed in DI water and air-dried. The surface layer further included some copper oxide. The sample was transferred to an ALD tool and 50 nm or amorphous $TiO_2$ was deposited onto the copper polysulfide, thereby forming a second surface sublayer. That is, the surface layer included copper polysulfide and $TiO_2$ sublayers. Based on the method of making, there was also likely some copper oxide between the copper sulfide and $TiO_2$ sublayers. The current collector was placed in a high-density plasma-enhanced chemical vapor deposition tool (HDPECVD). Amorphous silicon was deposited over the surface layer at a loading of about 0.8 mg/cm² to form the lithium storage layer.

Half Cells

Half cells were constructed using a 1.27 cm diameter punch of each anode. Lithium metal served as the counter electrode which was separated from the test anode using Celgard™ separators. The electrolyte solution included: a) 88 wt. % of 1.0 M $LiPF_6$ in 3:7 EC:EMC (weight ratio); b) 10 wt. % FEC; and c) 2 wt. % VC. Anodes first underwent a formation step. As is known in the art, the formation step is used to form an initial SEI layer. Relatively gentle conditions of low current and limited voltages may be used to ensure that the anode is not overly stressed. The performance cycling protocol included 3 C charging and C/3 discharging to roughly a 20% state of charge. A 10-minute rest was provided between charging and discharging cycles.

Figure 12:
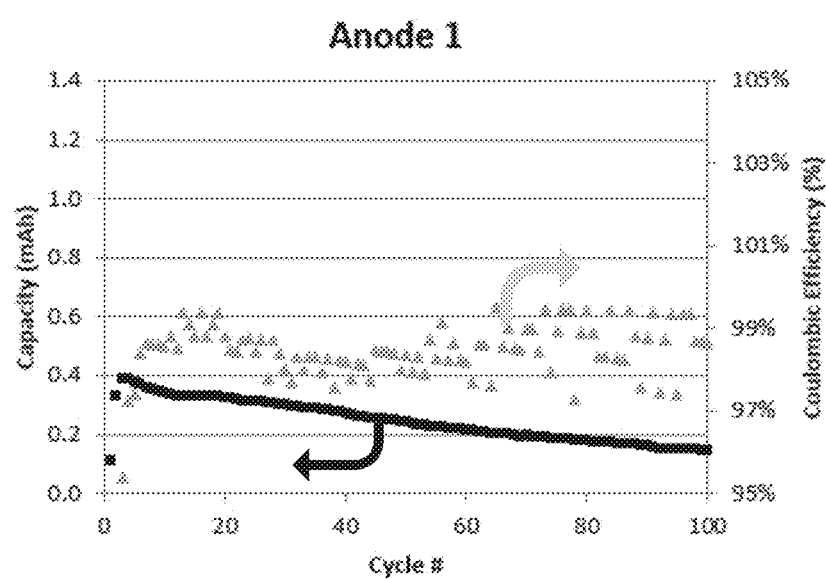
FIG. 12 show cycling performance data for an anode according to some embodiments of the present disclosure.
Figure 13:
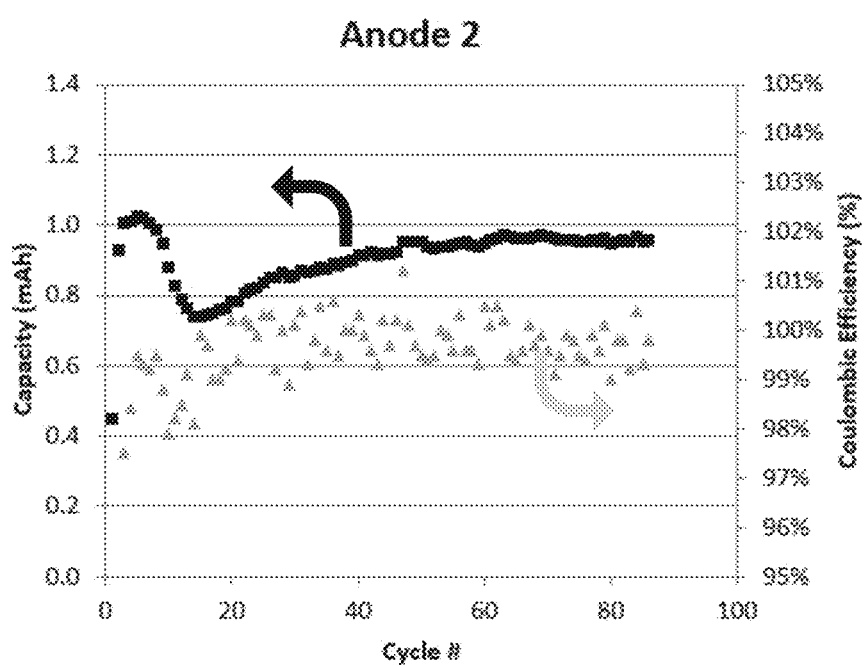
FIG. 13 show cycling performance data for an anode according to some embodiments of the present disclosure.
Figure 14:
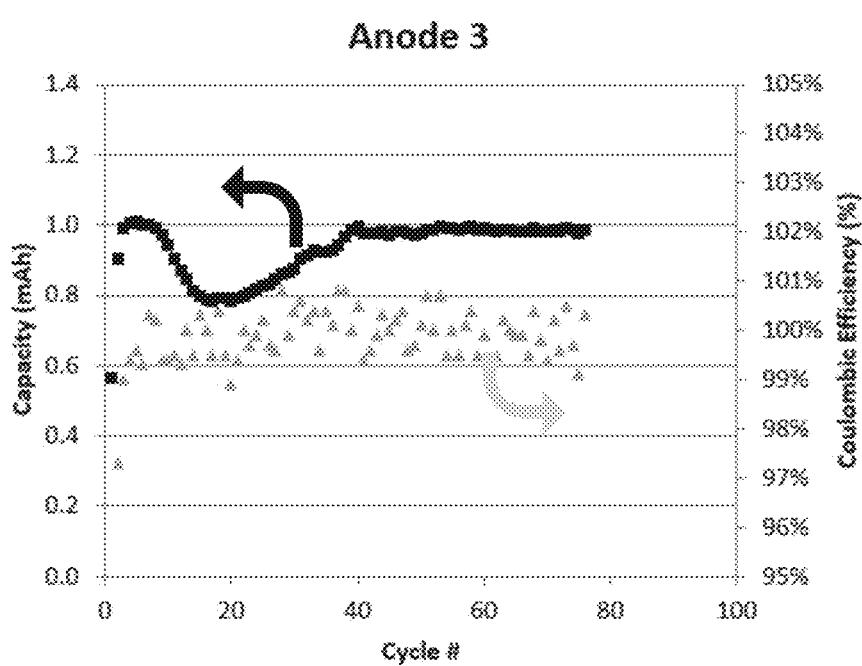
FIG. 14 show cycling performance data for an anode according to some embodiments of the present disclosure.

Plots of discharge capacity (mAh) and coulombic efficiency (%) as a function of cycle # are shown in FIGS. 12-14. Anode 1 (FIG. 12) degrades more quickly than Anode 2 (FIG. 13) and Anode 3 (FIG. 14), but it should be noted that Anode 1 at least is functional and much better than the comparative anode which did not work at all. It appears that the metal oxide sublayer (Anode 2 and Anode 3) may significantly improve cycling performance. Roughening the copper foil (Anode 2) may also improve cycling performance. Interestingly, both Anode 2 and Anode 3 show an initial dip in discharge capacity, but the anodes recover and become stable with cycling.

In some embodiments, the original, non-cycled anode may undergo significant structural or chemical changes during electrochemical charging/discharging, for example, from the formation step and/or the usage cycling in a battery. Unexpectedly, the anode formed from such electrochemical charging/discharging cycles may still have excellent performance properties, despite such structural and/or chemical changes.

Despite the industry's advocacy of micro- or nanostructured silicon or other lithium storage materials, it has been found in the present disclosure that highly effective anodes can be formed without such features. Relative to comparable micro- or nanostructured anodes, the anodes of the present disclosure may have one or more of at least the following unexpected advantages: comparable or improved stability at aggressive ≥1 C charging rates; higher overall areal charge capacity; higher gravimetric charge capacity; higher volumetric charge capacity; improved physical durability; simplified manufacturing process; and/or a more reproducible manufacturing process.

Although the present anodes have been discussed with reference to batteries, in some embodiments the present anodes may be used in hybrid lithium ion capacitor devices. Some non-limiting representative embodiments are listed below.

What is claimed:

1. A method of making an anode for use in an energy storage device, the method comprising:
   providing a current collector comprising an electrically conductive layer and a surface layer overlaying over the electrically conductive layer, wherein the surface layer has an average thickness of at least 0.002 µm and comprises a metal chalcogenide comprising at least one of sulfur or selenium; and
   depositing a continuous porous lithium storage layer onto the surface layer by a PECVD process, wherein the continuous porous lithium storage layer:
   has an average thickness in a range of 4 µm to 30 µm, comprises at least 85 atomic % amorphous silicon, and is substantially free of high aspect ratio nanostructures.

2. The method of claim 1, wherein the continuous porous lithium storage layer has a density in a range of 1.1 g/cm³ to 2.2 g/cm³.

3. The method of claim 2, wherein the continuous porous lithium storage layer comprises less than 2 atomic % carbon.

4. The method of claim 1, wherein the metal chalcogenide comprises a transition metal sulfide or transition metal polysulfide.

5. The method of claim 4, wherein the transition metal is copper.

6. The method of claim 1, wherein the electrically conductive layer comprises stainless steel, nickel, copper, titanium, or conductive carbon.

7. The method of claim 1, further comprising forming the surface layer by treating the electrically conductive layer with a solution comprising at least one of a polysulfide salt, a thiosulfate salt, or a polyselenide salt.

8. The method of claim 7, further comprising heating the electrically conductive layer to a temperature in a range of 100° C. to 350° C. after treating the electrically conductive layer with the solution.

9. The method of claim 1, further comprising forming the surface layer by depositing a metal sulfide, a metal polysulfide, a metal selenide, or a metal polyselenide onto the electrically conductive layer by a PVD process, a CVD process, or an ALD process.

10. The method of claim 1, wherein the surface layer further comprises a metal oxide.

11. The method of claim 10, further comprising forming a first surface sublayer comprising the metal chalcogenide and depositing the metal oxide as a second surface sublayer disposed over the first surface sublayer.

12. The method of claim 11, wherein the metal oxide is deposited by a PVD process, a CVD process, or an ALD process.

13. The method of claim 1, further comprising depositing a supplemental layer over the continuous porous lithium storage layer, wherein the supplemental layer comprises a metal compound deposited by a process comprising ALD, CVD, sputtering, thermal evaporation, electrochemical deposition, or electroless deposition.

14. The method of claim 13, wherein the supplemental layer comprises a lithium-containing material, a metal oxide, a metal nitride, or a metalcone.

15. The method of claim 1, further comprising, after depositing the continuous porous lithium storage layer, thermally treating the anode at a temperature in a range of 100° C. to 450° C. for a thermal treatment time in a range of 0.1 to 60 minutes.

16. The method of claim 1, wherein the surface layer has an average thickness in a range of 0.01 µm to 1.0 µm.

17. A lithium-ion battery comprising the anode made according to claim 1, a liquid electrolyte, a cathode, and a current separator disposed between the anode and the cathode.

18. The lithium-ion battery of claim 17, wherein the cathode comprises sulfur, selenium, or both sulfur and selenium.

* * * * *